(12) United States Patent
Nishio et al.

(10) Patent No.: US 11,505,111 B2
(45) Date of Patent: Nov. 22, 2022

(54) ILLUMINATION APPARATUS HAVING A COHERENT LIGHT SOURCE AND DIFFRACTION OPTICAL DEVICE THAT HAS A PLURALITY OF DIFFRACTION ZONES AND WIDENS THE WIDTH OF THE ILLUMINATION ZONE

(71) Applicant: Dai Nippon Printing Co., Ltd., Tokyo (JP)

(72) Inventors: Shumpei Nishio, Tokyo (JP); Makio Kurashige, Tokyo (JP); Kaori Nakatsugawa, Tokyo (JP); Tomoe Sato, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 17/451,206

(22) Filed: Oct. 18, 2021

(65) Prior Publication Data

US 2022/0032836 A1 Feb. 3, 2022

Related U.S. Application Data

(63) Continuation of application No. 16/990,210, filed on Aug. 11, 2020, now Pat. No. 11,186,219, which is a (Continued)

(30) Foreign Application Priority Data

Jun. 14, 2016 (JP) .............................. JP2016-117828

(51) Int. Cl.
*F21S 41/16* (2018.01)
*B60Q 1/04* (2006.01)
(Continued)

(52) U.S. Cl.
CPC ............. *B60Q 1/0408* (2013.01); *B60Q 1/00* (2013.01); *B60Q 1/04* (2013.01); *F21S 2/00* (2013.01); *G02B 5/18* (2013.01); *G02B 5/32* (2013.01)

(58) Field of Classification Search
CPC ......... F21S 41/16; G02B 5/18; G02B 5/1804; G02B 5/1809; G02B 5/1814;
(Continued)

(56) References Cited

U.S. PATENT DOCUMENTS 9,809,153 B2 11/2017 Park et al.
10,023,105 B2 7/2018 Kurashige
(Continued)

FOREIGN PATENT DOCUMENTS

JP H09-128687 A1 5/1997
JP 2005-326963 A1 11/2005
(Continued)

OTHER PUBLICATIONS

Chinese Office Action (with English translation) dated Feb. 28, 2022 (Application No. 201780036278.6).
(Continued)

*Primary Examiner* — Robert J May
(74) *Attorney, Agent, or Firm* — Burr & Brown, PLLC

(57) ABSTRACT

An illumination apparatus that illuminates an illumination zone having a first direction and a second direction crossing the first direction is provided with a light source to emit a coherent light beam, and a diffraction optical device to diffract the coherent light beam incident from the light source. The diffraction optical device diffracts the incident coherent light beam so that a width of the illumination zone in the second direction gradually becomes wider along the first direction of the illumination zone from a nearer side to the diffraction optical device.

8 Claims, 15 Drawing Sheets

Related U.S. Application Data continuation of application No. 16/309,241, filed as application No. PCT/JP2017/021847 on Jun. 13, 2017, now Pat. No. 10,773,636.

(51) Int. Cl.
  *F21S 2/00* (2016.01)
  *G02B 5/18* (2006.01)
  *G02B 5/32* (2006.01)
  *B60Q 1/00* (2006.01)

(58) Field of Classification Search
  CPC .. G02B 5/1819; G02B 5/1823; G02B 5/1828; G02B 5/1833; G02B 5/1838; G02B 5/1842; G02B 5/1847; G02B 5/152; G02B 5/1857; G02B 5/1861; G02B 5/1866; G02B 5/1871; G02B 5/1876; G02B 5/188; G02B 5/1885; G02B 5/189; G02B 5/1895
  See application file for complete search history.

(56) References Cited

U.S. PATENT DOCUMENTS

| | | |
|---|---|---|
| 2015/0009695 A1 | 1/2015 | Christmas et al. |
| 2017/0334341 A1 | 11/2017 | Kurashige et al. |
| 2018/0361912 A1 | 12/2018 | Daiku |

FOREIGN PATENT DOCUMENTS

| | | |
|---|---|---|
| JP | 2008-143505 A1 | 6/2008 |
| JP | 2008-247210 A1 | 10/2008 |
| JP | 2009-126433 A1 | 6/2009 |
| JP | 2012-254697 A1 | 12/2012 |
| JP | 2015-049380 A1 | 3/2015 |
| JP | 2015-132707 A1 | 7/2015 |
| JP | 2016-088395 A1 | 5/2016 |
| JP | 2016-088397 A1 | 5/2016 |
| WO | 2016/072484 A1 | 5/2016 |

OTHER PUBLICATIONS

International Search Report and Written Opinion (Application No. PCT/JP2017/021847) dated Sep. 19, 2017.
English translation of the International Preliminary Report on Patentability (Chapter I) (Application No. PCT/JP2017/021847) dated Dec. 27, 2018.
Extended European Search Report (Application No. 17813316.1) dated Nov. 21, 2019.
European Office Action (Application No. 17813316.1) dated Jul. 2, 2020.
Japanese Office Action (Application No. 2019-126384) dated Mar. 5, 2021 (with English translation).
European Office Action (Application No. 17 813 316.1) dated Mar. 25, 2021.
Chinese Office Action (Application No. 201780036278.6) dated Aug. 19, 2021 (with English translation).

ILLUMINATION APPARATUS HAVING A COHERENT LIGHT SOURCE AND DIFFRACTION OPTICAL DEVICE THAT HAS A PLURALITY OF DIFFRACTION ZONES AND WIDENS THE WIDTH OF THE ILLUMINATION ZONE

CROSS REFERENCE TO RELATED APPLICATIONS

This application is a continuation of U.S. application Ser. No. 16/990,210, filed Aug. 11, 2020, which is a continuation of U.S. application Ser. No. 16/309,241, filed Dec. 12, 2018, now U.S. Pat. No. 10,773,636, issued Sep. 15, 2020, which in turn is the National Stage entry of International Application No. PCT/JP2017/021847, filed Jun. 13, 2017, which designated the United States, the entireties of which are incorporated herein by reference.

FIELD OF THE INVENTION

The present disclosure relates to an illumination apparatus, a hologram device, and a vehicle control method, for illuminating an illumination zone having a longitudinal direction and a lateral direction.

BACKGROUND OF THE INVENTION

An illumination apparatus for illuminating a road surface with a desired pattern in combination of a light source and a hologram device has been proposed (see Patent Literature 1). In the illumination apparatus disclosed in Patent Literature 1, a laser beam generated by a single light source is diffracted by a single hologram device.

PRIOR ART DOCUMENT

Patent Literature

Patent Literature 1: Japanese Patent Laid-Open No. 2015-132707

SUMMARY OF THE INVENTION

A laser beam has high coherency compared to a non-coherent light beam such as an LED light beam, and hence is capable of clearly illuminating a desired zone in principle. However, in order to put the laser beam in practical use in an illumination apparatus, it is required to devise various ways in apparatus configuration and projection pattern.

Although, by combining laser beams in a plurality of wavelength ranges, various colors can be formed, any technical ideas using laser beams in a plurality of wavelength ranges are not disclosed in Patent Literature 1.

Moreover, although, even in the case of using a laser beam in a single wavelength range, an illumination form of an illumination zone can be changed in various ways, any technical ideas for changing the illumination form of the illumination zone in various ways are not disclosed in Patent Literature 1.

The present disclosure provides an illumination apparatus, a hologram device, and a vehicle control method, capable of optimizing the illumination form of the illumination zone even with a simple configuration.

In order to solve the above problems, according to an aspect of the present disclosure, there is provided an illumination apparatus that illuminates an illumination zone having a first direction and a second direction crossing the first direction comprising:

a light source to emit a coherent light beam; and
a diffraction optical device to diffract the coherent light beam incident from the light source, wherein the diffraction optical device diffracts the incident coherent light beam so that a width of the illumination zone in the second direction gradually becomes wider along the first direction of the illumination zone from a nearer side to the diffraction optical device.

A diffusion angle of the coherent light beam diffracted by the diffraction optical device in the second direction of the illumination zone may be constant in an entire zone of the illumination zone in the first direction.

An illumination apparatus that illuminates an illumination zone having a first direction and a second direction crossing the first direction comprises:

a light source to emit a coherent light beam; and
a diffraction optical device to diffract the coherent light beam incident from the light source, wherein the diffraction optical device may diffract the incident coherent light beam so that indicators are displayed in at least part of the illumination zone in the first direction.

The indicators may be displayed at a predetermined interval in the first direction of the illumination zone, and an illumination form of the indicators may be different from an illumination form of the illumination zone.

The indicators may be displayed at an end of the illumination zone in the first direction, and an illumination form of the indicators may be different from an illumination form of the illumination zone.

The indicators may be arranged so as to divide the illumination zone per predetermined distance along the first direction.

The light source emits a plurality of coherent light beams in wavelength ranges different from one another, wherein the diffraction optical device has:

a plurality of diffraction zones provided corresponding to the plurality of coherent light beams, respectively, each diffraction zone diffracting a corresponding coherent light beam to illuminate the illumination zone; and a synthesis optical system to combine the coherent light beams diffracted by the plurality of diffraction zones, respectively, wherein the illumination zone may be illuminated with a coherent light beam combined by the synthesis optical system.

The light source emits a plurality of coherent light beams in wavelength ranges different from one another, wherein the diffraction optical device has a diffraction plane, the plurality of coherent light beams being incident on the diffraction plane, a plurality of element diffraction zones to diffract the plurality of coherent light beams, respectively, are arranged on the diffraction plane in a mixed manner, and each of the plurality of element diffraction zones may illuminate the illumination zone.

According to another aspect of the present disclosure, an illumination apparatus that illuminates an illumination zone having a first direction and a second direction crossing the first direction comprises:

a light source to emit a coherent light beam; and
a diffraction optical device to diffract the coherent light beam incident from the light source, wherein the light source and the diffraction optical device may change an illumination form of the illumination zone.

The diffraction optical device has a plurality of diffraction zones, the plurality of diffraction zones illuminating partial zones that are arranged in the second direction in the illumination zone and different from one another, wherein the light source may vary a width of the illumination zone in the second direction by switching as to whether to make the coherent light beam incident on each of the plurality of diffraction zones.

The diffraction optical device has a plurality of diffraction zones, the plurality of diffraction zones illuminating partial zones that are arranged in the second direction in the illumination zone and different from one another, wherein the light source may vary a number to divide the illumination zone in the second direction by switching as to whether to make the coherent light beam incident on each of the plurality of diffraction zones.

The diffraction optical device has a plurality of diffraction zones to illuminate partial zones different from one another in the first direction in the illumination zone, wherein the light source may vary an illumination length of the illumination zone in the first direction by switching as to whether to make the coherent light beam incident on each of the plurality of diffraction zones.

The light source may change an illumination position on the illumination zone in the first direction by switching an incidence angle of the coherent light beam to the diffraction optical device.

An outgoing optical axis of the illumination apparatus may be switched to change an illumination position on the illumination zone in the first direction.

The light source emits a plurality of coherent light beams in wavelength ranges different from one another, wherein the diffraction optical device has a plurality of diffraction zones provided corresponding to the plurality of coherent light beams, respectively, each diffraction zone diffracting a corresponding coherent light beam, and the light source may change an illumination color of the illumination zone by switching as to whether, on the plurality of diffraction zones, to make corresponding coherent light beams incident.

There is provided a detector to acquire environmental information on surroundings of the illumination apparatus, wherein the light source and the diffraction optical device may change an illumination form of the illumination zone based on the environmental information acquired by the detector.

The illumination zone is a zone to illuminate part of a road closer to a shoulder of the road along a travel direction of a vehicle running on the road, wherein the detector detects whether a tire of the vehicle goes off to a shoulder side rather than to the illumination zone, and the light source and the diffraction optical device may change an illumination form of the illumination zone when the detector detects that the tire of the vehicle goes off to the shoulder side rather than to the illumination zone.

The illumination zone is a zone to illuminate part of a road along a travel direction of a vehicle running on the road, wherein the detector detects an obstacle in front in a running direction of the vehicle, and the light source and the diffraction optical device may change an illumination form of the illumination zone when the detector detects the obstacle.

The illumination zone is a zone to illuminate part of a road along a travel direction of a vehicle running on the road, wherein the detector detects whether it is possible to pass through a narrow part in front in a running direction of the vehicle, and the light source and the diffraction optical device may change an illumination form of the illumination zone in accordance with a detection result of the detector.

The illumination zone is a zone to illuminate part of a road along a travel direction of a vehicle running on the road, wherein the detector detects at least one of speed and acceleration of the vehicle, and the light source and the diffraction optical device may change an illumination target of the illumination zone based on at least one of the speed and acceleration of the vehicle detected by the detector.

The illumination zone is a zone to illuminate part of a road along a travel direction of a vehicle running on the road, wherein the detector detects a slope in front in a running direction of the vehicle, and the light source and the diffraction optical device may change an illumination form of the illumination zone in accordance with an inclination angle of the slope when the detector detects the slope.

According to an aspect of the present disclosure, there is provided a hologram device comprising a plural types of element hologram devices for diffracting coherent light beams in wavelength ranges different from one another, the element hologram devices being provided by a plural number for each type, the element hologram devices being arranged in a first direction and a second direction crossing each other, wherein two element hologram devices arranged next to each other in the first direction and the second direction diffract coherent light beams in wavelength ranges different from each other.

The plural types of element hologram devices provided by the plural number for each type may have a same number of element hologram devices for diffracting a coherent light beam in a wavelength range of red, element hologram devices for diffracting a coherent light beam in a wavelength range of green, and element hologram devices for diffracting a coherent light beam in a wavelength range of blue.

According to an aspect of the present disclosure, there is provided a hologram device comprising a first element hologram device, a second element hologram device, and a third element hologram device arranged next to one another in a first direction and a second direction crossing each other, wherein the first element hologram device diffracts a coherent light beam in a first wavelength range;

the second element hologram device diffracts a coherent light beam in a second wavelength range, different from the coherent light beam in the first wavelength range; and the third element hologram device diffracts a coherent light beam in a third wavelength range, different from the coherent light beams in the first wavelength range and in the second wavelength range.

According to an aspect of the present disclosure, there is provided a vehicle control method comprising:

acquiring environmental information on surroundings of an illumination apparatus;

making a coherent light beam incident from a light source to a diffraction optical device based on the acquired environmental information;

the diffraction optical device performing diffraction in accordance with an incident coherent light beam to change an illumination form of an illumination zone; and controlling a vehicle based on the acquired environmental information.

According to the present disclosure, the illumination form of the illumination zone can be optimized even with a simple configuration.

DETAILED DESCRIPTION OF THE INVENTION

Hereinbelow, an embodiment of the present disclosure will be explained with reference to the drawings. In the accompanying drawings of the present specification, for simplicity in drawings and easy understanding, the scale, the ratio of height to width, etc. are modified to be exaggerated from those of actual ones, according to need.

The terms such as "parallel", "intersect", and "the same", and the values of, for example, length and angle, which define shape, geometrical condition, and the degree of shape and geometrical condition, used in the present specification, are not necessary be limited to their strict definitions, but are interpreted to include the range to the extent that a similar function can be expected.

First Embodiment

Figure 1:
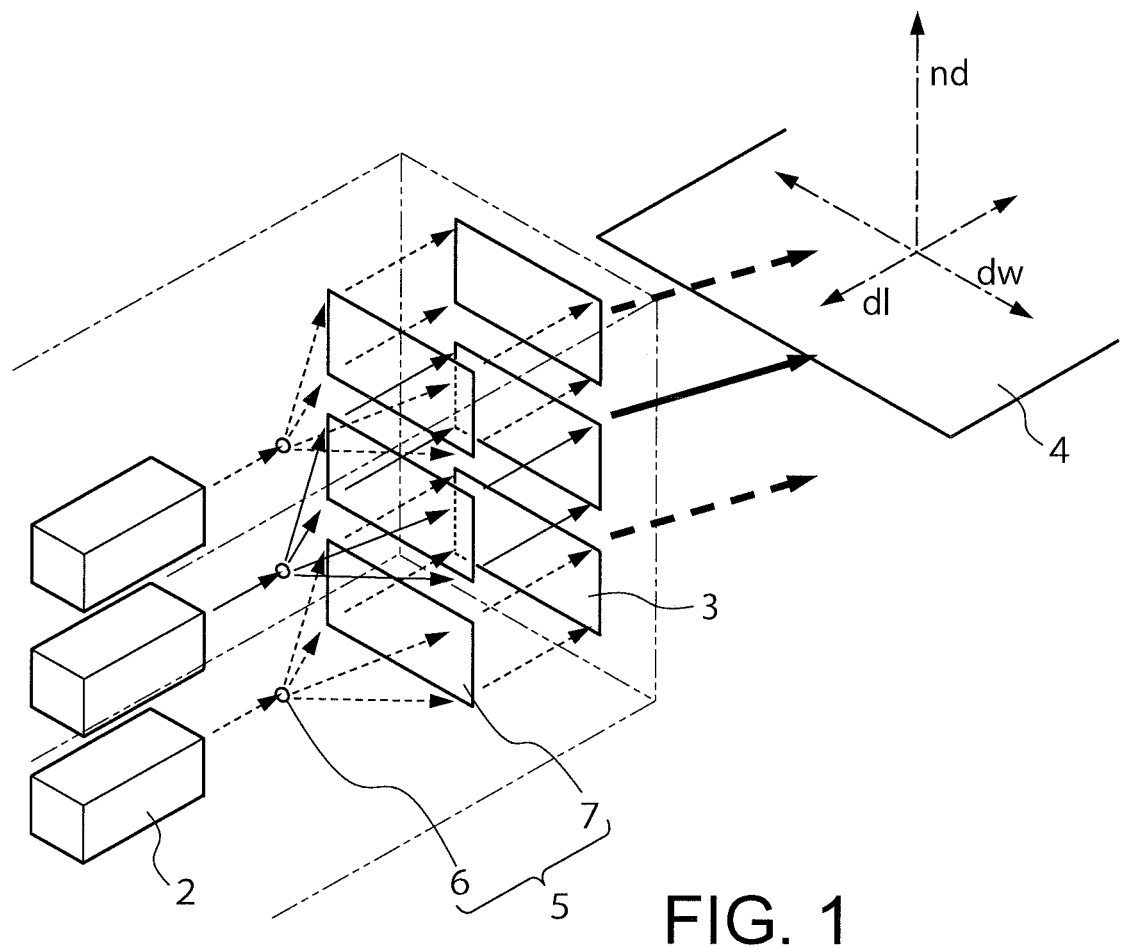
FIG. 1 is a perspective view schematically showing the configuration of an illumination apparatus according to a first embodiment of the present disclosure.

FIG. 1 is a perspective view schematically showing the configuration of an illumination apparatus 1 according to a first embodiment of the present disclosure. The illumination apparatus 1 of FIG. 1 is used, for example, as a portion of a headlight of a vehicle. However, the illumination apparatus 1 of FIG. 1 is applicable as a variety of illumination lights such as a tail light of the vehicle and a searchlight. The vehicle includes, not only a vehicle such as an automobile, but also a variety of the vehicle, such as a ship and an airplane, provided with the illumination apparatus 1. Hereinbelow, an example in which the illumination apparatus 1 of FIG. 1 is applied to a portion of a headlight of a vehicle, will be explained.

The illumination apparatus 1 of FIG. 1 is provided with light sources 2 and a plurality of diffraction optical devices 3. The light sources 2 emit a coherent light beam such as a laser beam. In the example of FIG. 1, although a plurality of light sources 2 are provided by the same number as the plurality of diffraction optical devices 3, the number of the light sources 2 is any number. Hereinbelow, an example in which one light source 2 is provided for each diffraction optical device 3, will be explained. The light source 2 is typically a laser light source 2 that emits a laser beam. Although there are a variety of types for the laser light source 2 such as a semiconductor laser, any type of the laser light source 2 is applicable.

The illumination apparatus 1 according to the first embodiment is not always necessary to be provided with a plurality of light sources 2 and a plurality of diffraction optical devices 3. It is enough for the illumination apparatus 1 to be provided with one light source 2 and one diffraction optical device 3. However, hereinbelow, an example of the illumination apparatus 1 provided with a plurality of light sources 2 and a plurality of diffraction optical devices 3, will be explained.

The wavelength ranges of coherent light beams to be emitted by the plurality of light sources 2 may be the same as or different from one another. However, hereinbelow, an example in which the plurality of light sources 2 emit coherent light beams in wavelength ranges different from one another, will be explained. Coherent light beams in wavelength ranges different from one another are, for example, coherent light beams in wavelength ranges of red, green and blue, three in total. It is a matter of course that the light sources 2 may emit coherent light beams of colors other than red, green and blue. Moreover, a plurality of light sources 2 in the same wavelength range may be provided to improve illumination intensity on an illumination zone 4.

The plurality of diffraction optical devices 3 diffract coherent light beams incident from the light sources 2, respectively, to illuminate the entire zone of the illumination zone 4. The illumination zone has a first direction and a second direction crossing each other. For example, a longitudinal direction and a lateral direction which will be described later may be the first direction and the second direction, respectively. In more specifically, each of the plurality of diffraction optical devices 3 diffracts an incident coherent light beam so that the width of the illumination zone 4 in the lateral direction gradually becomes wider along the longitudinal direction of the illumination zone 4 from a nearer side to the diffraction optical device 3.

The plurality of diffraction optical devices 3 are typically a plurality of hologram devices 3. As described later, by using the hologram devices 3 as the diffraction optical devices 3, it becomes easier to design the diffraction characteristics of each hologram device 3 and also relatively easy to design illumination such that each hologram device 3 illuminates the entire zone of the illumination zone 4. Hereinbelow, an example in which, as the plurality of diffraction optical devices 3, a plurality of hologram devices 3 are used, will be explained.

The illumination apparatus 1 of FIG. 1 is provided with a plurality of shaping optical systems 5 arranged between the plurality of light sources 2 and the plurality of hologram devices 3. Each shaping optical system 5 shapes a coherent light beam emitted from the corresponding light source 2 and converts the coherent light beam into a parallel beam.

In more specifically, each shaping optical system 5 has a first lens 6 to widen the beam diameter of a coherent light beam emitted from the light source 2 and a second lens 7 to convert the coherent light beam that has passed through the first lens 6 into a parallel beam. The coherent light beam converted into the parallel beam by the second lens 7 is incident on the corresponding hologram device 3. The optical configuration of the shaping optical system 5 is not limited to that of FIG. 1.

To each hologram device 3, a coherent light beam that has been emitted by the corresponding light source 2 and then shaped by the corresponding shaping optical system 5 is incident. Each hologram device 3 diffracts the incident coherent light beam to illuminate the entire zone of the illumination zone 4.

The illumination zone 4 is provided on a predetermined two-dimensional plane in an angle space in which light beams diffracted by the plurality of hologram devices 3 travel. The illumination zone 4 according to the present embodiment has a longitudinal direction dl and a lateral direction dw. In more specifically, the illumination zone 4 is a line-like illumination range having a predetermined width in the lateral direction dw and extending in the longitudinal direction dl. The width in the lateral direction dw is finite, however, it does not matter about the length in the longitudinal direction dl. Moreover, it is not always necessary to provide one illumination zone 4. When, for example, the illumination apparatus 1 according to the present embodiment is built in the vehicle, two line-like illumination zones 4 having the longitudinal direction dl in front and rear directions of the vehicle may be arranged with a gap therebetween, the gap being equal to the width of the vehicle. An advantage of the arrangement of two line-like illumination zones 4 with the gap equal to the width of the vehicle is that, when there is an obstacle in the vehicle travel direction, it can be easily determined by means of the gap between the two line-like illumination zones 4 whether it is possible to avoid the obstacle to travel.

The plurality of hologram devices 3 in FIG. 1 are placed vertically along a normal direction nd of the illumination zone 4. In other words, the plurality of hologram devices 3 are placed vertically along the normal direction nd of the illumination zone 4 that is disposed on a predetermined two-dimensional plane in an angle space in which a light beam diffracted by each hologram device 3 travels.

Figure 2:
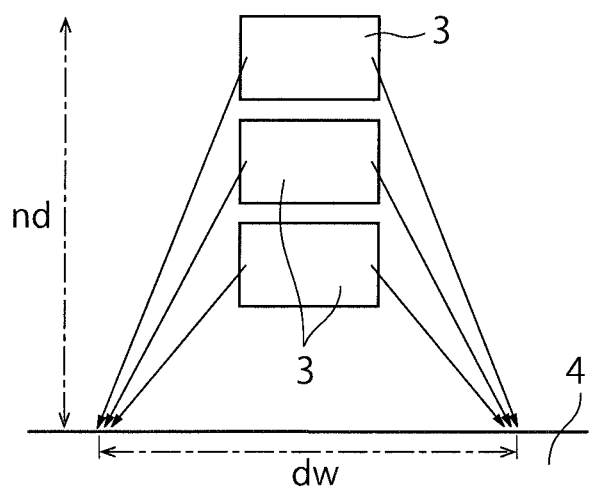
FIG. 2 is a figure showing travel directions of coherent light beams diffracted by a plurality of hologram devices.

FIG. 2 is a figure showing travel directions of coherent light beams diffracted by the plurality of hologram devices 3. As described above, each hologram device 3 of FIG. 2 illuminates the entire zone of the illumination zone 4.

Figure 3:
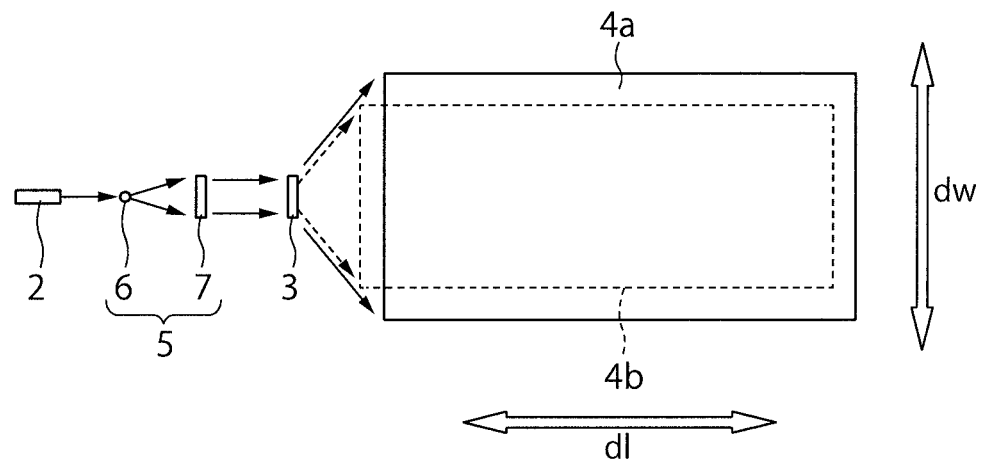
FIG. 3 is a plan view of an illumination zone viewed from a normal direction.

However, as shown in FIG. 2, when the plurality of hologram devices 3 are placed vertically, the illumination ranges of diffracted light beams of the hologram devices 3 do not always meet one another. As shown in FIG. 3, the illumination ranges may be displaced in both of the lateral direction dw and the longitudinal direction dl of the illumination zone 4. FIG. 3 shows an example of displacement in which a solid-line illumination range 4a is the correct illumination zone 4 whereas a broken line indicates a displaced illumination range 4b.

It is therefore, as shown in FIG. 2, when the plurality of hologram devices 3 are placed vertically, it is necessary to adjust diffraction characteristics per hologram device 3 so that the illumination range meets the illumination zone 4. In more specifically, it is required for respective hologram devices 3 to adjust the diffraction characteristics so that the positions of both edges that pass through both ends of the illumination zone 4 in the lateral direction dw to extend in the longitudinal direction dl meet one another, and the positions of both edges that pass through both ends of the illumination zone 4 in the longitudinal direction dl to extend in the lateral direction dw meet one another.

As described later, when each hologram device 3 has a plurality of element hologram devices 3c each illuminating the entire zone of the illumination zone 4, it is required for the respective element hologram devices 3c to adjust the diffraction characteristics so that the positions of four edges in total that extend in the longitudinal direction dl and the lateral direction dw meet one another.

Figure 4:
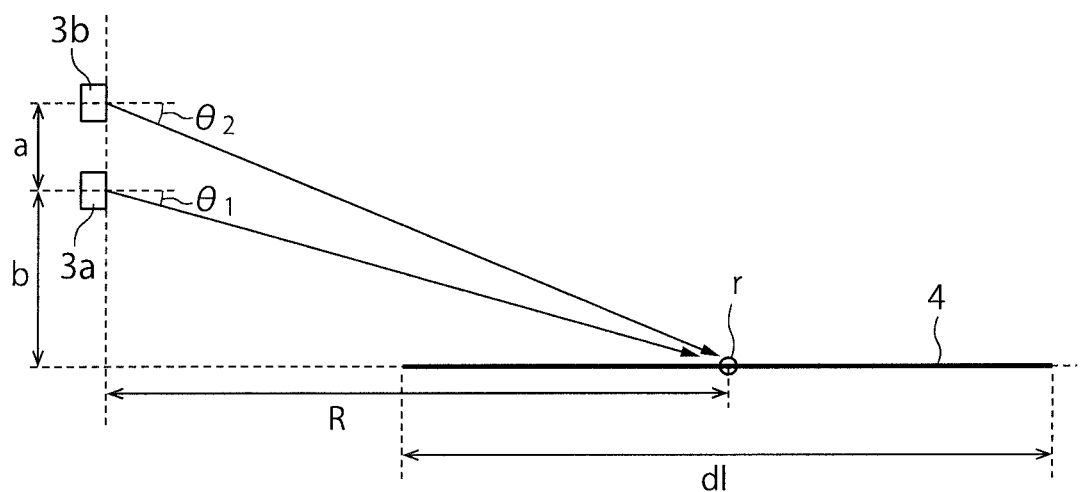
FIG. 4 is a figure explaining an adjustment method of diffraction characteristics of a plurality of hologram devices placed vertically.

FIG. 4 is a figure explaining an adjustment method of the diffraction characteristics of the plurality of hologram devices 3 placed vertically. FIG. 4 shows an example in which a first hologram device 3a is disposed upward by a distance b from a two-dimensional plane in which the illumination zone 4 is present and a second hologram device 3b is disposed upward by a distance a from the first hologram device 3a. FIG. 4 shows an example in which illumination ranges meet each other at a position r apart from the first hologram device 3a and the second hologram device 3b by a distance R in the longitudinal direction dl of the illumination zone 4. An angle between the direction of a light beam directed toward the position r from the first hologram devices 3a and the two-dimensional plane in which the illumination zone 4 is present is denoted as θ1, and an angle between the direction of a light beam directed toward the position r from the second hologram devices 3b and the two-dimensional plane is denoted as θ2.

The following expression (1) holds among the angle θ1, the distance b, and the distance R.

$$\tan \theta 1 = b/R \qquad (1)$$

Moreover, the following expression (2) holds among the angle θ2, the distance a, the distance b, and the distance R.

$$\tan \theta 2 = (b+a)/R \qquad (2)$$

By adjusting the diffraction characteristics of respective hologram devices 3 for each distance R so as to satisfy the above expressions (1) and (2), the positions of both edges that pass through the both ends of the illumination zone 4 in the longitudinal direction dl to extend in the lateral direction dw can meet one another.

Figure 5:
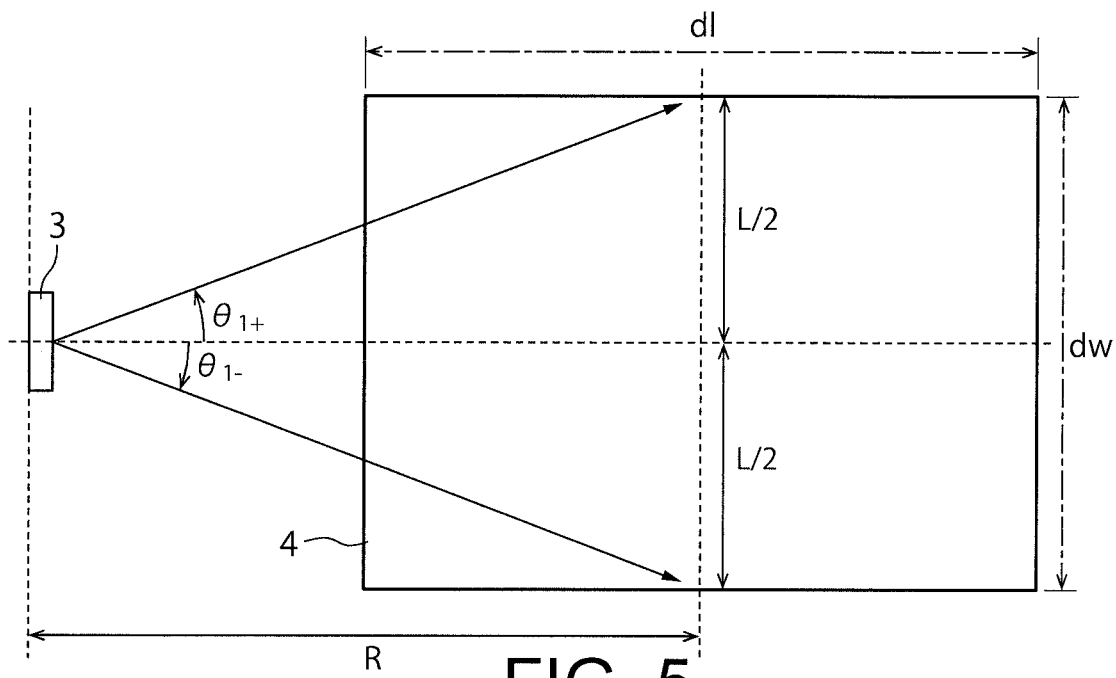
FIG. 5 is a figure showing a positional relationship between each hologram device and an illumination zone viewed from a normal direction of the illumination zone.
Figure 6:
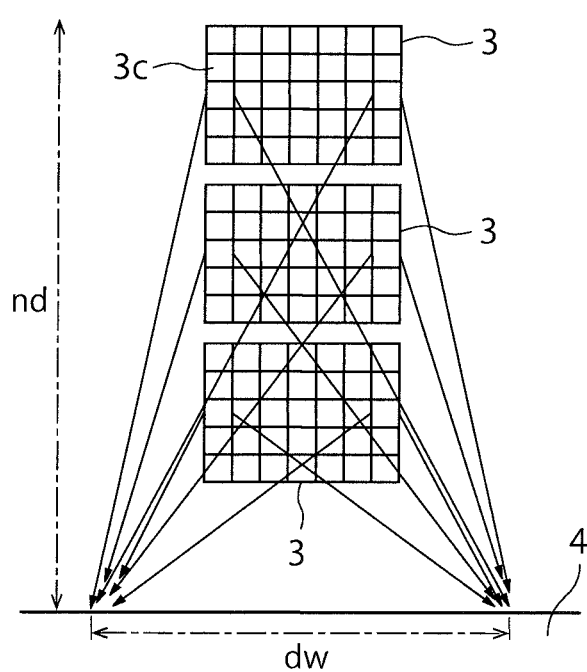
FIG. 6 is a figure showing an example in which each hologram device includes a plurality of element hologram devices.

In order to align the positions of both edges that pass through both ends of the illumination zone 4 in the lateral direction dw to extend in the longitudinal direction dl to meet one another, the diffraction characteristics of each hologram device 3 may be adjusted based on FIG. 5. FIG. 5 is a figure showing a positional relationship between each hologram device 3 and the illumination zone 4 viewed from the normal direction of the illumination zone 4. Since the hologram devices 3 are placed vertically in the normal direction of the illumination zone 4, FIG. 5 shows only one hologram device 3. In FIG. 5, the angle range of a diffracted light beam of the hologram device 3 is θ1$^+$+θ1$^-$, R being the shortest distance from the position of the hologram device 3 to an arbitrary position in the illumination zone 4.

The angles θ1$^+$, θ1$^-$ in FIG. 5 are expressed by the following expressions (3) and (4), respectively.

$$\tan \theta 1^+ = L/(2R) \qquad (3)$$

$$\tan \theta 1^- = -L/(2R) \qquad (4)$$

A condition for illumination with a width equal to the width of the illumination zone 4 in the lateral direction dw at a position with the distance R from the hologram device 3 is that the hologram device 3 has diffraction angles θ1$^+$ and θ1$^-$ that satisfy the expressions (3) and (4), respectively. As understood from the expressions (3) and (4), even if a width L of the illumination zone 4 in the lateral direction dw is constant, when the distance R varies, the angles θ1$^+$ and θ1$^-$ vary. In other words, the adjustment of diffraction characteristics of each hologram device 3 is required to be performed for each distance R. As described above, by adjusting the diffraction characteristics of respective hologram devices 3 so as to satisfy the above expressions (3) and (4), the positions of both edges that pass through both ends of the illumination zone 4 in the lateral direction dw to extend in the longitudinal direction dl can meet one another.

In summarizing the above, when the plurality of hologram devices 3 are placed vertically, by adjusting the diffraction characteristics of each hologram device 3 based on the above-described expressions (1) to (4), the ranges illuminated by the hologram devices 3 can meet one another. Accordingly, blurring on the border of the illumination zone 4 can be reduced to enable human eyes to visually perceive the illumination zone 4 clearly.

As described above, in order to match the positions of both ends of the illumination zone 4 in the longitudinal direction dl and also both ends in the lateral direction dw to meet one another for the plurality of hologram devices 3, it is required to adjust the diffraction characteristics of the hologram devices 3 for each distance R described above, based on the expressions (1) to (4).

In the present embodiment, in order to perform such an adjustment on computer, it is presupposed to use a computer generated hologram (CGH) as the plurality of hologram devices 3. Since the CGH does not require a light source 2 for emitting object light, an optical system for forming an interference fringe, and a blank hologram recording medium for forming an interference fringe, and an interference-fringe recording process can be performed on computer, and thus it is easy to generate an interference fringe having any diffraction characteristics.

Each of the plurality of hologram devices 3 in FIG. 1 may have a plurality of element hologram devices 3c divided vertically and horizontally. Each element hologram device 3c has diffraction characteristics capable of illuminating the entire zone of the illumination zone 4. The element hologram devices 3c may not have the same size. Among the plurality of hologram devices 3, a part of the hologram devices 3 may only have a plurality of element holograms whereas the remaining hologram devices 3 may have a unitary configuration. However, hereinbelow, for easy explanation, an example of the hologram devices 3 each having the plurality of element hologram devices 3c, will be explained.

Each hologram device 3 has the plurality of element hologram devices 3c and each element hologram device 3c illuminates the entire zone of the illumination zone 4, so that the safety of a laser beam (coherent light beam) can be improved with weakened laser brightness when the hologram device 3 is observed from the illumination zone 4's side. Since each element hologram device 3c diffuses a coherent light beam incident on an incidence surface thereof toward the entire zone of the illumination zone 4, the brightness of the hologram device 3 when observed from the illumination zone 4's side is much weaker than the brightness of a coherent light beam emitted from the light source 2. Therefore, even line of light is directed toward the direction of the light source 2 from any point in the illumination zone 4, the possibility of hurting human eyes is reduced. Moreover, on respective points in the illumination zone 4, coherent light beams from the plurality of element hologram devices 3c are incident at incidence angles different from one another. Accordingly, light interference patterns are overlapped one another with no correlation to be averaged, and, as a result, in the illumination zone 4, speckles to be observed by human eyes become inconspicuous.

Figure 7:
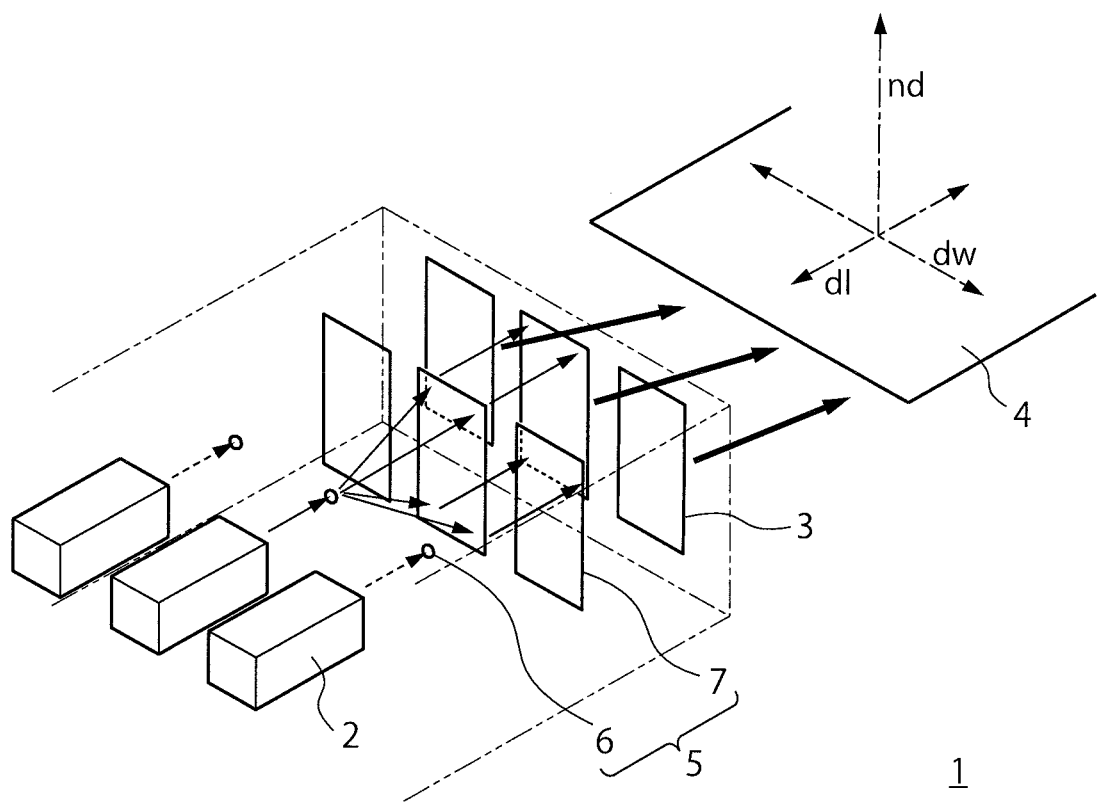
FIG. 7 is a perspective view showing an example in which a plurality of hologram devices are arranged in a lateral direction of an illumination zone.

Although FIG. 1 shows the example of the plurality of hologram devices 3 placed vertically in the normal direction of the illumination zone 4, as shown in FIG. 7, the plurality of hologram devices 3 may be arranged in the lateral direction dw of the illumination zone 4.

Figure 8:
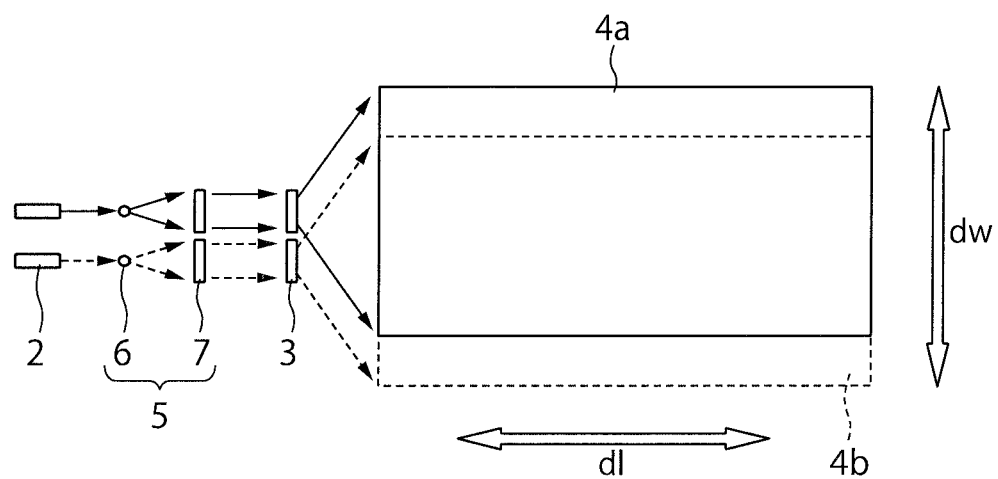
FIG. 8 is a schematic plan view of FIG. 7 viewed from above.

FIG. 8 is a schematic plan view of FIG. 7 viewed from above. For simplification, FIG. 8 shows two from among the three light sources 2, two from among the three shaping optical systems 5, and two from among the three hologram devices 3, provided in FIG. 7.

When the plurality of hologram devices 3 are arranged in the lateral direction dw of the illumination zone 4, if the hologram devices 3 have the same diffraction characteristics, illumination ranges of diffracted light beams of the hologram devices 3 are displaced from one another as shown in FIG. 8. This displacement occurs on both edges that pass through both ends of the illumination zone 4 in the lateral direction dw to extend in the longitudinal direction dl. Therefore, both edges of the illumination zone 4 may blur.

It is therefore desirable to adjust the diffraction characteristics of the plurality of hologram devices 3 one by one so that the illumination ranges of diffracted light beams of the hologram devices 3 overlap one another as much as possible. In other words, it is desirable to adjust the diffraction characteristics of the hologram devices 3 so that the positions of both edges that pass through both ends of the illumination zone 4 in the lateral direction dw to extend in the longitudinal direction dl meet one another among the hologram devices 3.

Figure 9:
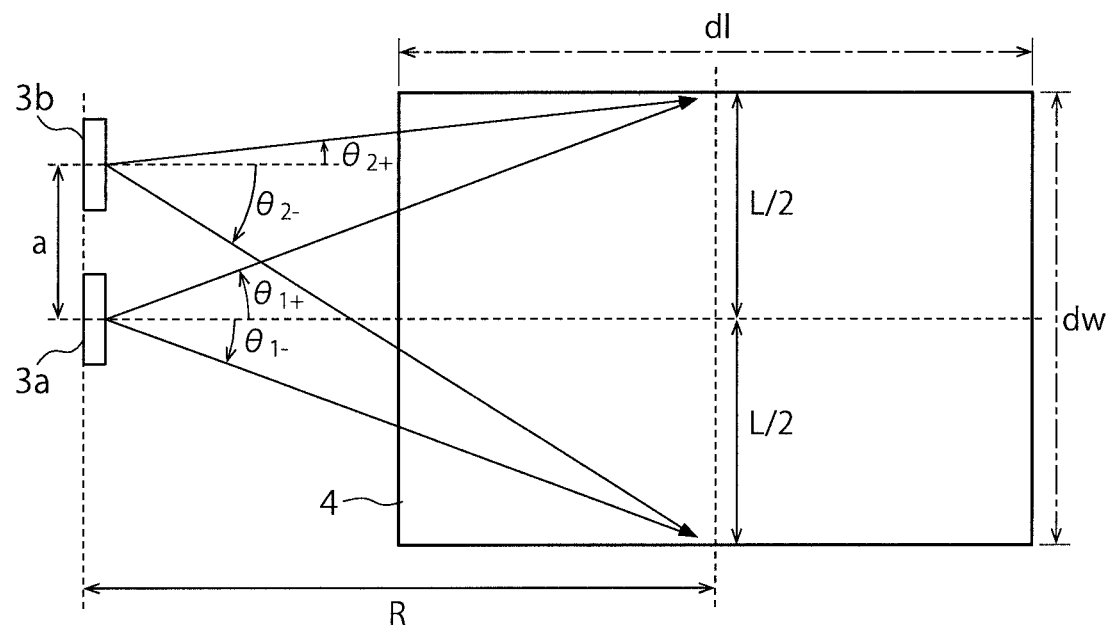
FIG. 9 is a figure explaining an adjustment method of diffraction characteristics of two hologram devices adjacent to each other along a lateral direction of an illumination zone.

FIG. 9 is a figure explaining an adjustment method of the diffraction characteristics of two hologram devices 3 (hereinbelow, a first hologram device 3a and a second hologram device 3b) adjacent to each other along the lateral direction dw of the illumination zone 4. FIG. 9 shows an example in which, the illumination zone 4 has a width L in the lateral direction dw, the first hologram device 3a is disposed on a line that passes through the center of the illumination zone 4 in the lateral direction dw to extend in the longitudinal direction dl, and the second hologram device 3b is disposed apart from the first hologram devices 3a by the distance a in the lateral direction dw of the illumination zone 4.

In FIG. 9, it is defined that a diffracted light beam of the first hologram device 3a has an angle range of $\theta 1^+ + \theta 1^-$, and a diffracted light beam of the second hologram device 3b has an angle range of $\theta 2^+ + \theta 2^-$, R being the shortest distance from the positions of the first hologram device 3a and the second hologram device 3b to an arbitrary position in the illumination zone 4.

Angles $\theta 1^+$ and $\theta 1^-$ in FIG. 9 are expressed by the following expressions (5) and (6), respectively.

$$\tan \theta 1^+ = L/(2R) \quad (5)$$

$$\tan \theta 1^- = -L/(2R) \quad (6)$$

Moreover, angles $\theta 2^+$ and $\theta 2^-$ in FIG. 9 are expressed by the following expressions (7) and (8), respectively.

$$\tan \theta 2^+ = 1/R \times (L/2 - a) \quad (7)$$

$$\tan \theta 2^- = 1/R \times (-L/2 - a) \quad (8)$$

As described above, a condition for illumination with a width equal to the width of the illumination zone 4 in the lateral direction dw at a position with the distance R from the first hologram device 3a is that the first hologram device 3a has diffraction angles $\theta 1^+$ and $\theta 1^-$ that satisfy the expressions (5) and (6), respectively. Likewise, a condition for illumination with a width equal to the width of the illumination zone 4 in the lateral direction dw at a position with the distance R from the second hologram device 3b is that the second hologram device 3b has diffraction angles $\theta 2^+$ and $\theta 2^-$ that satisfy the expressions (7) and (8), respectively.

As understood from the expressions (5) to (8), even if the width L of the illumination zone 4 in the lateral direction dw is constant, when the distance R varies, the angles $\theta 1^+$, $\theta 1^-$, $\theta 2^+$, and $\theta 2^-$ vary. In other words, the adjustments of diffraction characteristics of the first hologram device 3a and the second hologram device 3b are required to be performed for each distance R.

As described above, in order to match the positions of both edges of the illumination zone 4 in the longitudinal direction dl to meet one another among the plurality of hologram devices 3, it is required to adjust the diffraction characteristics of the hologram devices 3 for each distance R described above, based on the expressions (5) to (8).

(Unique Configuration of First Embodiment)

Figure 10:
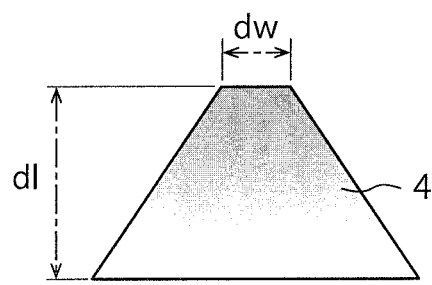
FIG. 10 is a figure showing a trapezoidal illumination zone visually perceived by human eyes.

FIG. 5 described above shows an example in which the width of the illumination zone 4 in the lateral direction dw is constant at any point of the illumination zone 4 in the longitudinal direction dl. In this case, as shown in FIG. 10, the illumination zone 4 is visually perceived as having a larger width in the lateral direction at a nearer side of the illumination zone 4 to human eyes whereas having a smaller width in the lateral direction at a farther side of the illumination zone 4 from the human eyes. According to the inspection by the present inventor, it is found that although the illumination zone 4 is visually perceived as having a smaller width in the lateral direction at the farther side of the illumination zone 4, since a coherent light beam is used as the light source 2, the illumination zone 4 can be visually perceived clearly up to the farther side of the illumination zone 4.

It is known that the optical output of the light source 2 that emits a coherent light beam depends on the product of the illuminance and the area of illumination of the illumination zone 4. When the illuminance of the illumination zone 4 is not varied, the light source 2 requires smaller optical output for a smaller area of illumination. Therefore, in the present embodiment, the length of a line-like illumination zone 4 in the lateral direction is set at the farthest end of the illumination zone 4 in the longitudinal direction so that, when a human present in the vicinity of the hologram devices 3 looks out the illumination zone 4 over the farthest direction in the longitudinal direction, the human can visually perceive correctly the farthest end of the illumination zone 4 in the longitudinal direction. In more specifically, the length of the illumination zone 4 in the lateral direction is varied to a plural number of lengths at the farthest end of the illumination zone 4 in the longitudinal direction, and the length of the illumination zone 4 in the lateral direction at the farthest end of the illumination zone 4 in the longitudinal direction is set in accordance with the shortest length that can be visually perceived by the human.

Figure 11:
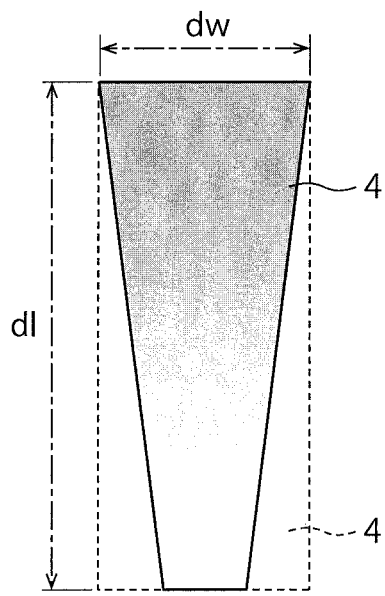
FIG. 11 is a figure showing an illumination range of an illumination zone.

Next, a diffusion angle of each hologram device 3 is set so that the length of the illumination zone 4 in the lateral direction at the farthest end of the illumination zone 4 in the longitudinal direction is set to the above-described set value and the length of the illumination zone 4 in the lateral direction can be visually perceived as being constant over the entire zone of the illumination zone 4 in the longitudinal direction. In this setting, the diffusion angle of each hologram device 3 is set to be always constant irrespective of the position on the illumination zone 4 in the longitudinal direction. Accordingly, the illumination range of the illumination zone 4 viewed from the normal direction nd becomes a trapezoid as shown in FIG. 11 from a rectangle such as in FIG. 5. In more specifically, the illumination range of the illumination zone 4 becomes a trapezoid that has the shortest length in the lateral direction at one end of the illumination zone 4 in the longitudinal direction closer to each hologram device 3 and the longest length in the lateral direction at another end of the illumination zone 4 in the longitudinal direction farthest from each hologram device 3.

Accordingly, the area of the trapezoidal illumination range in FIG. 11 can be reduced as understood by comparison with the rectangular illumination range shown by a broken line. In other words, this means that the optical output of the light source 2 that emits a coherent light beam can be reduced.

Figure 12:
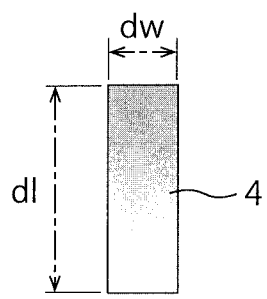
FIG. 12 is a figure showing a rectangular illumination zone visually perceived by human eyes.

As described above, when the illumination range of the illumination zone 4 is formed into a trapezoid as shown in FIG. 11, an effect is given in such a manner that the width of the illumination zone 4 in the lateral direction can be visually perceived by human eyes as being almost constant at any position on the illumination zone 4 in the longitudinal direction, as shown in FIG. 12. As a matter of course, an apparent length of the illumination zone 4 in the lateral direction varies depending on the height of human eyes and the distance between the illumination zone 4 and the position of the human eyes. Therefore, the width of the illumination zone 4 in the lateral direction may not always be constant at any position in the longitudinal direction. However, the difference in width of the illumination zone 4 in the lateral direction is visually perceived as being smaller.

In this case, the diffusion angle of each hologram device 3 is always constant irrespective of the position on the illumination zone 4 in the longitudinal direction. Such a setting of the diffusion angle of each hologram device 3 can be performed comparatively easily when the CGH is used as the hologram device 3.

An example explained in FIG. 1 provides a plurality of light sources 2 that emit a plurality of coherent light beams in wavelength ranges different from one another and a plurality of hologram devices 3. However, only one light source 2 and also only one hologram device 3 may be provided. In the case of only one light source 2 and only one hologram device 3, although the illumination color of the illumination zone 4 is a single color, by forming the illumination range of the illumination zone 4 into a trapezoid in the same manner as in FIG. 11, the width of the illumination zone 4 in the lateral direction can be apparently constant.

Moreover, when the hologram device 3 is divided into a plurality of element hologram devices 3c, a part of the element hologram devices 3c may illuminate the illumination zone 4 in a rectangular shape as shown in FIG. 5, and at least another part of the element hologram devices 3c may illuminate the illumination zone 4 in a trapezoidal shape as shown in FIG. 10. By means of a beam scanning device 8 shown in FIG. 13, the element hologram devices 3c on which a coherent light beam from the light source 2 is to be incident can be switched to select whether the illumination form of the illumination zone 4 visually perceived by a human is set as shown in FIG. 10 or FIG. 12.

As described above, in the first embodiment, under the condition that the farthest end of the illumination zone 4 in the longitudinal direction can be visually perceived by human eyes, the width of the illumination zone 4 in the lateral direction is made to be visually perceived by the human eyes as being almost the same width over the entire zone of the illumination zone 4 in the longitudinal direction. In this way, although the illumination zone 4 becomes a trapezoid, it is visually perceived as a rectangle by the human eyes. By forming the illumination zone 4 into a trapezoid, the area of the illumination zone 4 can be reduced further to reduce the optical output of the light source 2. Therefore, the light source 2 can be made compact with a reduced parts cost, and heat generation from the light source 2 can be restricted to improve durability of the light source 2. Moreover, since the width of the illumination zone 4 in the lateral direction can be visually perceived by the human eyes as being constant over the entire zone of the illumination zone 4 in the longitudinal direction, visual perception of the illumination zone 4 is improved. Furthermore, the illumination zone 4 can be illuminated by setting the diffusion angle of each hologram device 3 to a constant angle irrespective of the position on the illumination zone 4 in the longitudinal direction. Therefore, the diffraction characteristics of each hologram device 3 can be set relatively easily.

Second Embodiment

A second embodiment displays an indicator in the illumination zone 4.

An illumination apparatus 1 according to the second embodiment has the same configuration as that of FIG. 1 or FIG. 7, common with the first embodiment, except for an illumination form of the illumination zone 4 different from the illumination form of the first embodiment.

The illumination apparatus 1 according to the second embodiment illuminates a line-like illumination zone 4, in the same manner as the first embodiment. The first embodiment shows an example in which the width of the illumination zone 4 in the lateral direction can be visually perceive by human eyes as being constant over the entire zone of the illumination zone 4 in the longitudinal direction. The second embodiment may be the same as the first embodiment or may be configured in such a manner that the width of the illumination zone 4 in the lateral direction is visually perceived by human eyes in a manner that the width in the lateral direction becomes smaller at a farther side in the longitudinal direction.

Figure 14:
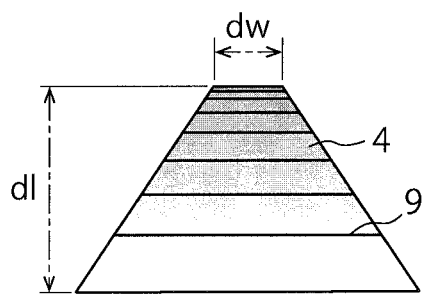
FIG. 14 is a figure showing an illumination zone according to a second embodiment.
Figure 15:
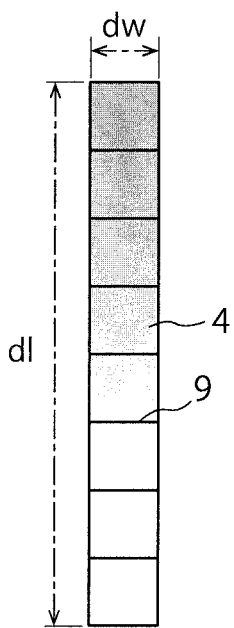
FIG. 15 is a plan view of the illumination zone of FIG. 14 viewed from a normal direction.

FIG. 14 is a figure showing an illumination zone 4 according to the second embodiment, showing the state of the illumination zone 4 visually perceived by human eyes. An example shown here is that an actual illumination range of the illumination zone 4 is a rectangle as shown in FIG. 5, and the width of the illumination zone 4 in the lateral direction is visually perceived by the human eyes in such a manner that the width in the lateral direction becomes smaller at a farther side in the longitudinal direction. FIG. 15 is a plan view of the illumination zone 4 of FIG. 14 viewed from the normal direction.

In the illumination zone 4 according to the present embodiment, indicators 9, for example, formed with lateral lines are displayed per predetermined distance. It is desirable that the predetermined distance has a value of, for example, 10 meters or 100 meters by which an accumulated distance can be easily known. A display color of the indicators 9 is desirably a color distinguishable from the display color of the illumination zone 4. In the case of an illumination apparatus 1 provided with one light source 2 and one hologram devices 3, the indicators 9 may be displayed with a broken line or a thick line so as to be distinguishable from the illumination zone 4. As described above, the illumination form of the indicators 9 is different from line illumination of the illumination zone 4. The difference in illumination form may be the difference in color, line width, line type, shape, etc.

By displaying the indicators 9 such as shown in FIG. 14, as being superposed on the illumination zone 4, it is easy to know the distance of the illumination zone 4 in the longitudinal direction. For example, when the indicators 9 are displayed at a 10-meter interval, it is easy to recognize that the distance from the forefront to the rearward third indicator 9 is 3×10=30 meters.

The indicators 9 according to the second embodiment can be easily displayed by adjusting the diffusion characteristics of a part of element hologram devices 3c of one or a plurality of hologram devices 3. For example, when displaying the indicators 9 in a color different from the illumination color of the illumination zone 4, it may be configured such that diffracted light beams from hologram devices 3 different from one another are incident on the display positions of the indicators 9 and the other illumination positions of the illumination zone 4. Or hologram devices 3 that are not shown may be provided, other than the hologram devices 3 for line illumination, to illuminate the indicators 9.

Or, when each of the plurality of hologram devices 3 has a plurality of element hologram devices 3c, element hologram devices 3c for displaying the indicators 9 may be provided other than the element hologram devices 3c for illuminating the illumination zone 4.

Figure 16A:
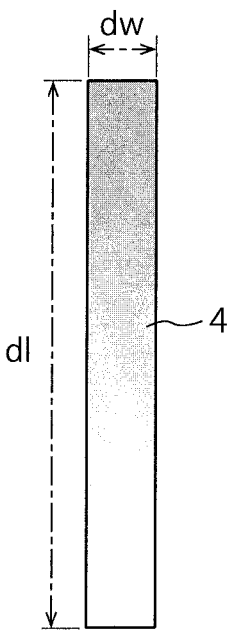
FIG. 16A shows an example of an illumination zone to be illuminated by a first element hologram device or a first hologram device.
Figure 16B:
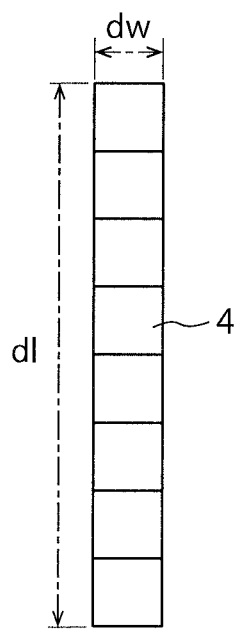
FIG. 16B shows an example of indicators to be illuminated by a second element hologram device or a second hologram device.

FIG. 16A shows an example of the illumination zone 4 to be illuminated by a first element hologram device or a first hologram device. FIG. 16B shows an example of the indicators 9 to be illuminated by a second element hologram device or a second hologram device. By superposing the illumination zone 4 of FIG. 16A and the indicators 9 of FIG. 16B, the indicators 9 are displayed as being superposed on the illumination zone 4 as shown in FIGS. 14 and 15.

In the above-described example, the indicators 9 are displayed at a predetermined interval in the illumination zone 4. However, the interval of the indicators 9 may not necessary be uniform. For example, in the case of the illumination apparatus 1 for use in a headlamp of vehicle, the interval of the indicators 9 may be smaller as the indicators 9 are closer to the vehicle whereas larger as the indicators 9 are farther from the vehicle.

As described, in the second embodiment, since the indicators 9 are displayed as being superposed on the line-like illumination zone 4 at a predetermined interval, the length of the illumination zone 4 in the longitudinal direction can be easily recognized. Therefore, by illuminating the line-like illumination zone 4 along a vehicle travel direction and by displaying the indicators 9 as being superposed on the illumination zone 4, it is easier to sharpen the sense of distance in the vehicle travel direction, so that, for example, the distance to an obstacle or a target can be correctly recognized.

Third Embodiment

A third embodiment displays indicators on both ends of a line-like illumination zone 4 in the longitudinal direction.

An illumination apparatus 1 according to the third embodiment has the same configuration as that of FIG. 1 or FIG. 7, common with the first embodiment, except for an illumination form of the illumination zone 4 different from the illumination form of the first embodiment.

The illumination apparatus 1 according to the third embodiment illuminates a line-like illumination zone 4, in the same manner as the first embodiment. The first embodiment shows an example in which the width of the illumination zone 4 in the lateral direction dw can be visually perceived by human eyes as being constant over the entire zone of the illumination zone 4 in the longitudinal direction dl. The third embodiment may be the same as the first embodiment or may be configured in such a manner that the width of the illumination zone 4 in the lateral direction dw is visually perceived by the human eyes in a manner that the width in the lateral direction dw becomes smaller at a farther side in the longitudinal direction dl.

Figure 17:
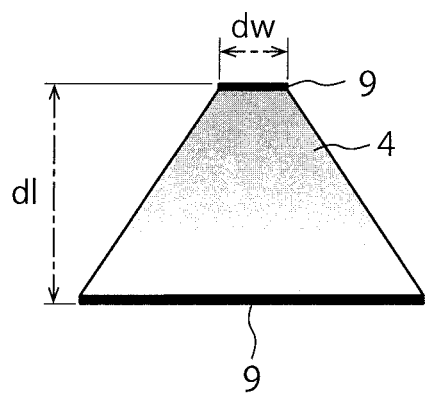
FIG. 17 is a figure showing an illumination zone according to a third embodiment.
Figure 18:
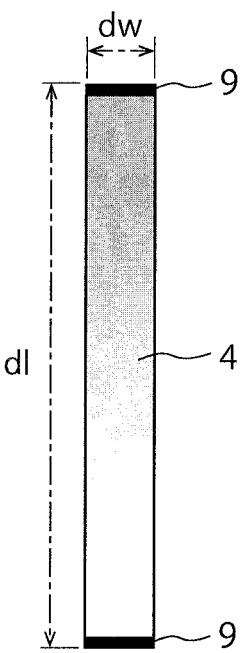
FIG. 18 is a plan view of the illumination zone of FIG. 17 viewed from a normal direction.

FIG. 17 is a figure showing an illumination zone 4 according to the third embodiment, showing the state of the illumination zone 4 visually perceived by human eyes. An example shown here is that an actual illumination range of the illumination zone 4 is a rectangle as shown in FIG. 5, and the width of the illumination zone 4 in the lateral direction dw is visually perceived the human eyes in such a manner that the width in the lateral direction dw becomes smaller at a farther side in the longitudinal direction dl. FIG. 18 is a plan view of the illumination zone 4 of FIG. 17 viewed from the normal direction.

As shown in FIGS. 17 and 18, indicators 9 are displayed on both ends of a line-like illumination zone 4 in the longitudinal direction dl. The illumination form of the indicators 9 is different from line illumination of the illumination zone 4. In more specifically, the indicators 9 are different from line illumination in at least one of color, line width, line type, and shape. For example, with line illumination in white, the indicators 9 may be illuminated with a color, such as red, distinguishable from white.

By displaying the indicators 9 on both ends of the illumination zone 4 in the longitudinal direction dl, it is easier to know a start point and an end point of the illumination zone 4. For example, when the length of the illumination zone 4 in the longitudinal direction dl is predetermined, it is easier to know the end point of the illumination zone 4.

The indicators 9 of the third embodiment can be displayed on both ends of the illumination zone 4 in the longitudinal direction dl by the same method as for the indicators 9 of the second embodiment, using at least a part of the hologram devices 3. For example, by using element hologram devices 3c different from element hologram devices 3c for line illumination, illumination may be performed on both ends of the illumination zone 4 in the longitudinal direction dl in a different illumination form. Or hologram devices 3, other than the plurality of hologram devices 3 for line illumination, may be provided to illuminate the indicators 9.

As described above, in the third embodiment, since the indicators 9 are displayed on both ends of the line-like illumination zone 4 in the longitudinal direction dl, it is easier to know the start point and the end point of the illumination zone 4. Therefore, even if the length of the illumination zone 4 in the longitudinal direction dl is very long, it is easier to know the farthest end position of the illumination zone 4.

Other than displaying the indicators on both ends as described above, the indicators may be displayed only on one end. Specifically, the indicators may be displayed only on an end closer to the light source, that is, only at the start point of the illumination zone, or only on an end farthest from the light source, that is, at the end point of the illumination zone 4.

Fourth Embodiment

A fourth embodiment provides indicators 9 that divide the illumination zone 4 along the longitudinal direction dl per predetermined distance.

An illumination apparatus 1 of the fourth embodiment has the same configuration as that of FIG. 1 or FIG. 7, common with the first embodiment, except for an illumination form of the illumination zone 4 different from the illumination form of the first embodiment.

The illumination apparatus 1 according to the fourth embodiment illuminates a line-like illumination zone 4, in the same manner as the first embodiment. The first embodiment shows an example in which the width of the illumination zone 4 in the lateral direction dw can be visually perceived by human eyes as being constant over the entire zone of the illumination zone 4 in the longitudinal direction dl. The fourth embodiment may be the same as the first embodiment or may be configured in such a manner that the width of the illumination zone 4 in the lateral direction dw is visually perceived by the human eyes in a manner that the width in the lateral direction becomes smaller at a farther side in the longitudinal direction.

Figure 19:
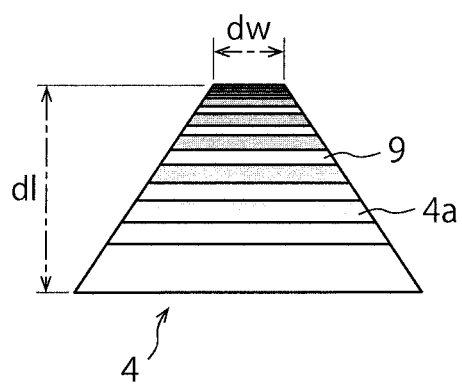
FIG. 19 is a figure showing an illumination zone according to a fourth embodiment.
Figure 20:
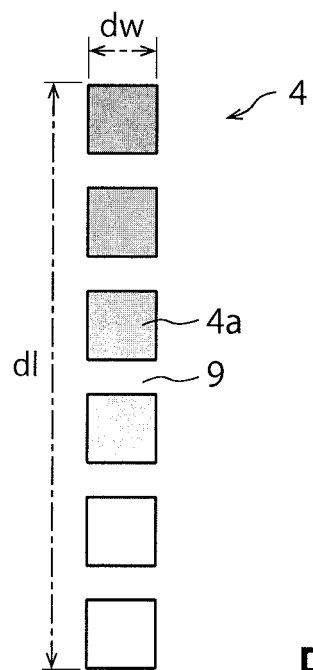
FIG. 20 is a plan view of the illumination zone 4 of FIG. 19 viewed from a normal direction.

FIG. 19 is a figure showing an illumination zone 4 according to the fourth embodiment, showing the state of the illumination zone 4 visually perceived by human eyes. An example shown here is that an actual illumination range of the illumination zone 4 is a rectangle as shown in FIG. 5, and the width of the illumination zone 4 in the lateral direction dw is visually perceived in such a manner that the width in the lateral direction dw becomes smaller at a farther side in the longitudinal direction dl. FIG. 20 is a plan view of the illumination zone 4 of FIG. 19 viewed from the normal direction.

As shown in FIGS. 19 and 20, line illumination of the illumination zone 4 is intermittent broken-line like illumination. The length of one line illumination element 4a is a predetermined length, preferably having a value of, for example, 5 meters or 50 meters by which an accumulated distance can be easily known. Between two line illumination elements 4a adjacent to each other in the longitudinal direction dl, a non-illumination zone which can serve as the indicator 9 is provided. For example, when the length of one line illumination element 4a in the longitudinal direction dl and the length of the non-illumination zone in the longitudinal direction dl are both 5 meters, the sum of both lengths is 10 meters. Therefore, by counting the number of the line illumination elements 4a, it is easier to sharpen the sense of distance. For example, the distance from the forefront to the fifth line illumination element 4a is about 5×10=50 meters, or more or less.

The indicators 9 of the fourth embodiment are non-illumination zones which may be formed by such control of diffracted light beams from the hologram devices 3 that the diffracted light beams are not incident on the locations corresponding to the indicators 9. As one specific example of control may be adjustments to diffraction fringes of the hologram devices 3 so that light is not diffracted in the non-illumination zones. Or a scanning range of a coherent light beam from the light source 2 may be controlled so that the coherent light beam is not incident on a partial zone on each hologram device 3.

As described above, in the fourth embodiment, the indicators 9 are provided so that the illumination zone 4 is divided along the longitudinal direction dl per predetermined distance. Therefore, by counting the number of divided line illumination elements 4a, it is easier to recognize the distance of the illumination zone 4 in the longitudinal direction dl.

Fifth Embodiment

A fifth embodiment prevents the occurrence of color shift at a location in the vicinity of a light emitting component.

Figure 21:
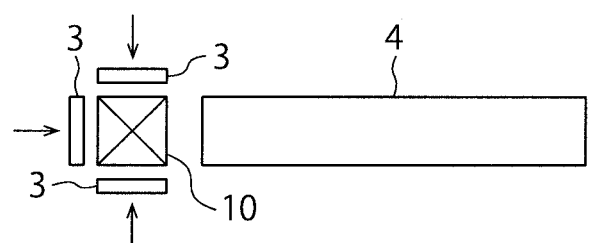
FIG. 21 is a figure schematically showing the optical configuration of diffraction optical devices and their surroundings according to a fifth embodiment.

FIG. 21 is a figure schematically showing the optical configuration of diffraction optical devices 3 and their surroundings according to the fifth embodiment. An illumination apparatus 1 of FIG. 21 has a dichroic mirror 10 in addition to a plurality of hologram devices 3 on which coherent light beams in wavelength ranges different from one another are incident. A plurality of coherent light beams diffracted by the plurality of hologram devices 3 are incident on the dichroic mirror 10. The dichroic mirror 10 is a mirror that passes light in a specific wavelength range therethrough whereas reflects light in the other wavelength ranges. In other words, the dichroic mirror 10 is a synthesis optical system that combines coherent light beams diffracted in a plurality of diffraction zones, respectively, such as the plurality of hologram devices 3.

The dichroic mirror 10 in the example of FIG. 21 reflects coherent light beams diffracted by hologram devices 3 for red and blue, respectively, whereas passes therethrough a coherent light beam diffracted by a hologram device 3 for green. The dichroic mirror 10 combines the three kinds of diffracted light beams and emits the combined light beam. A light beam combined by the dichroic mirror 10 is, for example, a white light beam. An output light beam of the dichroic mirror 10 becomes an illumination light beam for illuminating the illumination zone 4.

As described above, by providing the dichroic mirror 10, a combined light beam can be generated before reaching the illumination zone 4. Therefore, color shift does not occur at a location in the vicinity of a light emitting component in such a case of superposing a plurality of coherent light beams on the illumination zone 4.

Figure 22:
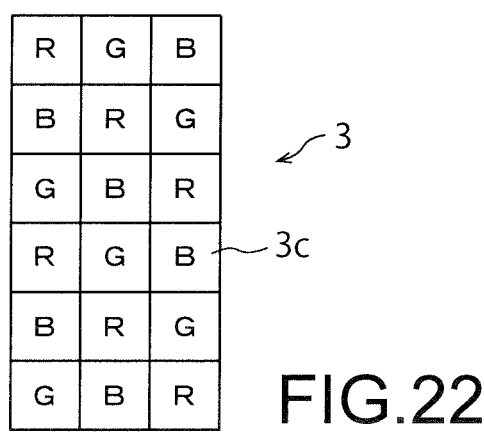
FIG. 22 is a figure showing one modification example of a method of preventing the occurrence of color shift, different from the method in FIG. 21.

FIG. 22 is a figure showing one modification example of another method of preventing the occurrence of color shift at a location in the vicinity of a light emitting component, and shows the configuration of a diffraction plane of a hologram device 3. While the illumination apparatus 1 of FIG. 1 is provided with a plurality of hologram devices 3 corresponding to a plurality of coherent light beams, an illumination apparatus 1 using the hologram device 3 of FIG. 22 may be provided with only one hologram device 3.

On a diffraction plane of the hologram device 3 of FIG. 22, a plurality of element hologram devices 3c for diffracting, respectively, a plurality of coherent light beams in wavelength ranges different from one another are provided in a mixed manner. The plurality of element hologram devices 3c are a plurality of element diffraction zones for diffracting a plurality of coherent light beams, respectively. On the diffraction plane, the plurality of element diffraction zones are arranged in a mixed manner. In more specifically, as shown in FIG. 22, element hologram devices 3c of the same color are provided so as not to be next to each other in at least one of vertical and lateral directions. Moreover, element hologram devices 3c of each color are uniformly dispersed in the diffraction plane. Accordingly, coherent light beams diffracted on the entire diffraction plane are incident on the illumination zone 4 in such a state of being sufficiently mixed one another, so that color shift does not occur at a location in the vicinity of a light emitting unit.

As described above, in the fifth embodiment, a process of synthesis or mixing is performed before coherent light beams in a plurality of wavelength ranges diffracted by the hologram devices 3 are incident on the illumination zone 4, so that color shift at a location in the vicinity of the light emitting component can be reduced.

Sixth Embodiment

A sixth embodiment varies the width of a line-like illumination zone 4 in the lateral direction dw.

Figure 23:
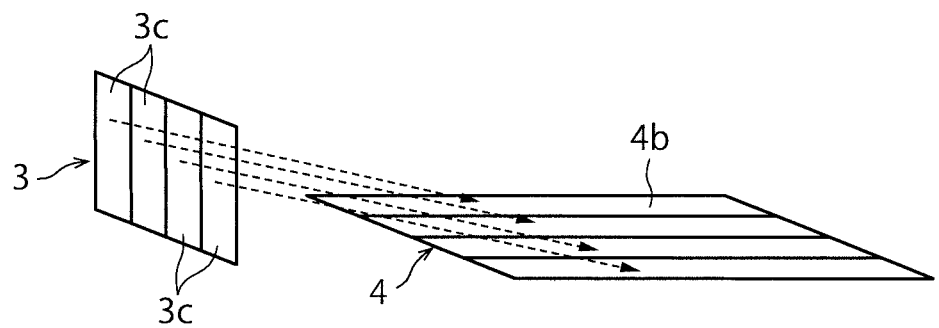
FIG. 23 is a figure showing an example of varying the width of a line-like illumination zone in a lateral direction.

An illumination apparatus 1 according to the sixth embodiment has the same configuration as that of FIG. 1 or FIG. 7, common with the first embodiment, except for an illumination form of the illumination zone 4 different from the illumination form of the first embodiment. The illumination apparatus 1 according to the sixth embodiment illuminates a line-like illumination zone 4, in the same manner as the first embodiment. Each hologram device 3 according to the sixth embodiment has, as shown in FIG. 23, a plurality of element hologram devices 3c arranged in the lateral direction dw of the illumination zone 4. Or, as shown in FIG. 7, a plurality of hologram devices 3 may be arranged in the lateral direction dw of the illumination zone 4. Hereinbelow, an example will be explained in which a plurality of hologram devices 3 are placed vertically in the same manner as in FIG. 1 and each hologram device 3 has a plurality of element hologram devices 3c arranged in the lateral direction dw of the illumination zone 4. FIG. 23 will be explained on condition that FIG. 23 shows the configuration of one of the plurality of vertically-placed hologram devices 3 or a single hologram device 3 in the illumination apparatus 1.

Each element hologram device 3c of FIG. 23 illuminates one corresponding partial zone 4b extending in the longitudinal direction dl of the illumination zone 4. As shown, when there are four element hologram devices 3c, there are also four partial zones 4b that constitute the illumination zone 4. The length of the partial zones 4b in the longitudinal direction dl is the same as the length of the illumination zone 4 in the longitudinal direction dl whereas the length of each partial zone 4b in the lateral direction dw is shorter than the length of the illumination zone 4 in the lateral direction dw.

Figure 13:
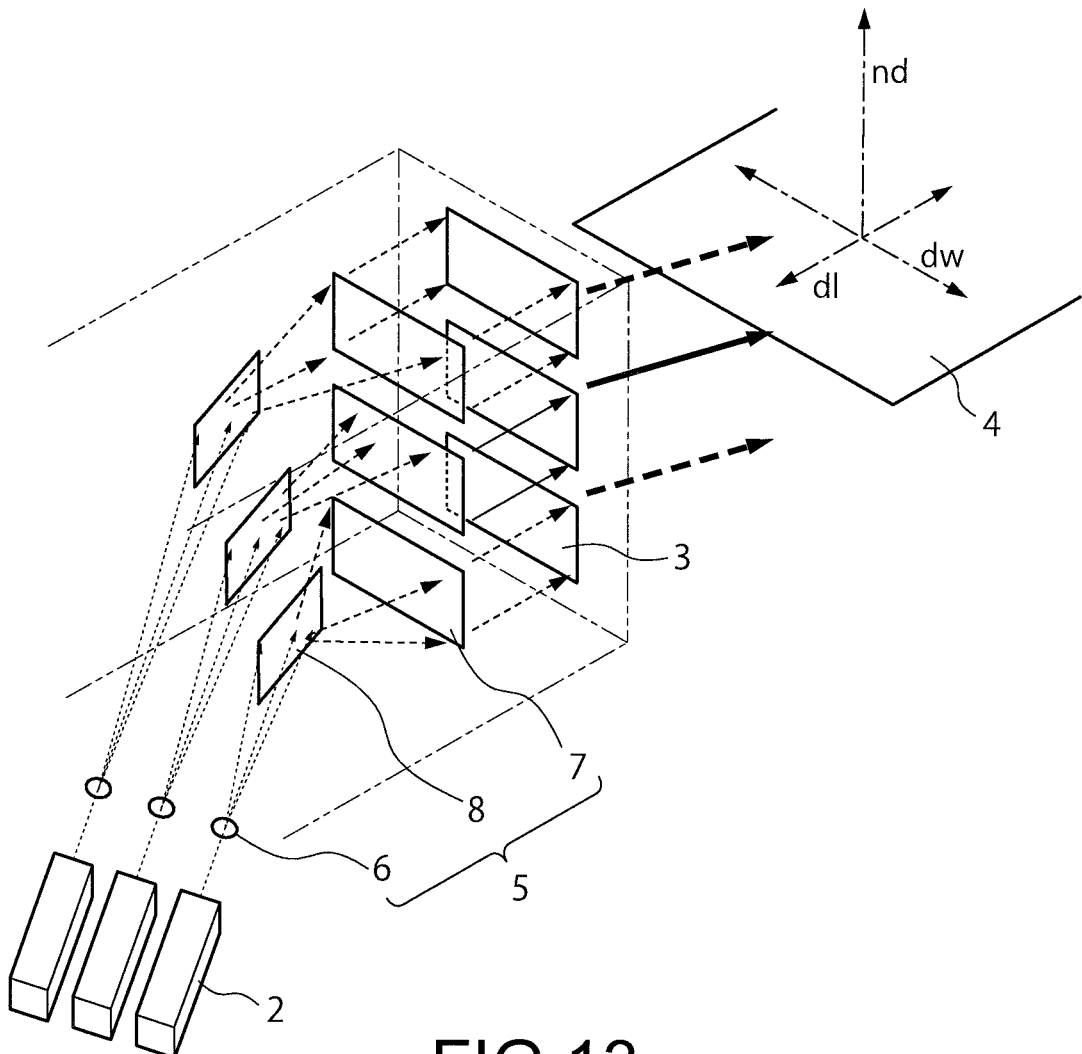
FIG. 13 is a perspective view schematically showing the configuration of an illumination apparatus provided with an optical scanning device.

The light source 2 shown in FIG. 1 can switch as to whether to emit coherent light beams to the four element hologram devices 3c of FIG. 23, separately. Such switching may be performed, for example, by providing an optical scanning device 8 such as shown in FIG. 13 between the light source 2 and the hologram device 3, and by switching the scanning range of the optical scanning device 8 to make a coherent light beam from the light source 2 incident on a desired element hologram device 3c.

Figure 24:
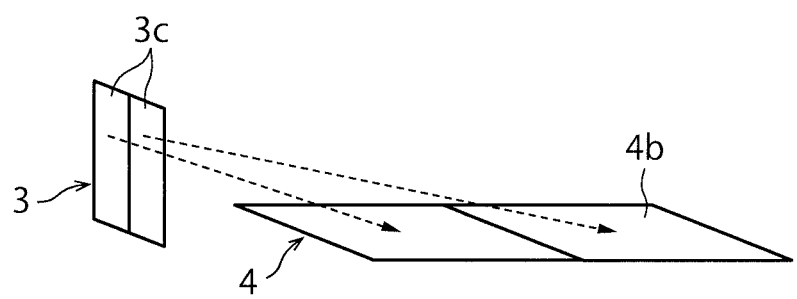
FIG. 24 is a figure showing an example of varying the width or illumination position of a line-like illumination zone in a longitudinal direction.

Accordingly, diffracted light beams from the element hologram devices 3c can be switched separately as to whether each light beam is guided to the corresponding partial zone 4b, so that the width of the illumination zone 4 in the lateral direction dw can be varied. Moreover, not only simply switching the width of the illumination zone 4 in the lateral direction dw, the plurality of partial zones 4b divided in the lateral direction dw can be illuminated as shown in FIG. 24.

By varying the width of such a line-like illumination zone 4, for example, it is possible to draw driver's attention on road conditions and surrounding environment. In more specifically, when there is a traffic jam, an accident, suspension of traffic, etc. in a vehicle travel direction, the width of the illumination zone 4 can be varied to draw driver's attention in advance. Moreover, in accordance with the vehicle size, the width of the illumination zone 4 may be varied. Or in accordance with the preference of a user, such as a driver, the width of the illumination zone 4 may be varied. Furthermore, in accordance with the brightness of surroundings, the width of the illumination zone 4 may be varied. Practically, if the surroundings are dark, the illumination zone 4 can be visually perceived even if the width of the illumination zone 4 is narrow, while, as the surroundings become brighter, by increasing the width of the illumination zone 4, the illumination zone 4 can be visually perceived much more.

As described above, in the sixth embodiment, since the width of the line-like illumination zone 4 in the lateral direction dw can be varied, the illumination zone 4 can be used for the purpose of drawing one's attention or the visual perception of the illumination zone 4 can be improved.

Seventh Embodiment

A seventh embodiment varies the length of or illumination position on a line-like illumination zone 4 in the longitudinal direction dl.

An illumination apparatus 1 according to the seventh embodiment has the same configuration as that of FIG. 1 or FIG. 7, common with the first embodiment, except for an illumination form of the illumination zone 4 different from the illumination form of the first embodiment. The illumination apparatus 1 according to the seventh embodiment illuminates a line-like illumination zone 4, in the same manner as the first embodiment. Each hologram device 3 according to the sixth embodiment has, as shown in FIG. 24, a plurality of element hologram devices 3c arranged in the lateral direction dw of the illumination zone 4. Or, as shown in FIG. 7, a plurality of hologram devices 3 may be arranged in the lateral direction dw of the illumination zone 4. Hereinbelow, an example will be explained in which a plurality of hologram devices 3 are placed vertically in the same manner as in FIG. 1 and each hologram device 3 has a plurality of element hologram devices 3c arranged in the lateral direction dw of the illumination zone 4. FIG. 24 will be explained on condition that FIG. 24 shows the configuration of one of the plurality of vertically-placed hologram devices 3 or a single hologram device 3 in the illumination apparatus 1.

In the example of FIG. 24, two element hologram devices 3c are aligned in the lateral direction dw of the illumination zone 4. These element hologram devices 3c are different in diffusion angle, so that a diffracted light beam of one of the element hologram devices 3c illuminates a partial zone 4b in the illumination zone 4, closer to the element hologram devices 3c, whereas a diffracted light beam of the other element hologram device 3c illuminates a partial zone 4b in the illumination zone 4, far from the element hologram devices 3c.

The light source 2 can switch as to whether to emit coherent light beams to the two element hologram devices 3c, separately. Such switching may be performed, as described in the sixth embodiment, for example, by providing an optical scanning device 8 such as shown in FIG. 13. By making coherent light beams incident on both of the two element hologram devices 3c, the length of the illumination zone 4 in the longitudinal direction dl becomes maximum. Moreover, by making a coherent light beam incident only on either one of the element hologram devices 3c, depending on which element hologram device 3c a coherent light beam is made incident on, the illumination position on the illumination zone 4 in the longitudinal direction dl can be varied.

Although FIG. 24 shows an example of the hologram device 3 having two element hologram devices 3c, by providing a large number of element hologram devices 3c, the length of the illumination zone 4 in the longitudinal direction dl and the illumination position on the illumination zone 4 in the longitudinal direction dl can be changed finely.

Figure 25:
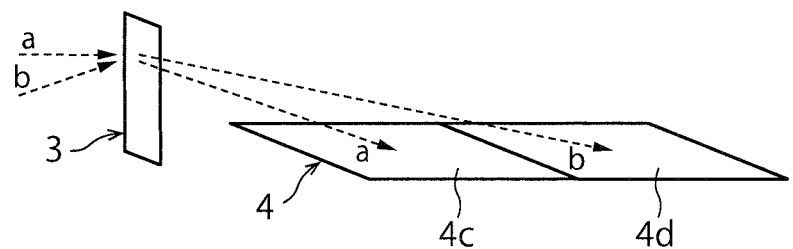
FIG. 25 is a figure explaining one modification example of FIG. 24.

FIG. 25 is a figure explaining one modification example of FIG. 24. By varying the incidence angle of a coherent light beam to the hologram device 3, the diffraction angle on the hologram device 3 can be varied. FIG. 25 shows an example in which, when a coherent light beam is incident on the hologram device at an incidence angle a, the illumination range in the illumination zone 4 by the diffracted light beam of the hologram device 3 is a partial zone 4c closer to the hologram device 3, whereas, at an incidence angle b, the illumination range in the illumination zone 4 is a partial zone 4d far from the hologram device 3. Therefore, by varying the incidence angle of the coherent light beam to the hologram device 3, the illumination position on the illumination zone 4 in the longitudinal direction dl can be changed. Moreover, by making a plurality of coherent light beams simultaneously incident on the hologram device 3 from incidence angle directions different from one another, both of the partial zones 4c and 4d can be illuminated, and accordingly, the length of the illumination zone 4 in the longitudinal direction dl can be varied.

Figure 26A:
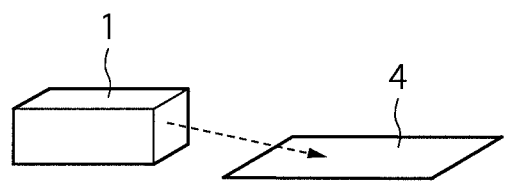
FIG. 26A is a figure schematically showing an example of changing an outgoing optical-axis direction of an illumination apparatus having a light source and a hologram device.
Figure 26B:
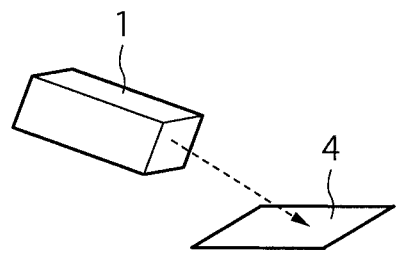
FIG. 26B is a figure schematically showing an example of changing an outgoing optical-axis direction of an illumination apparatus having a light source and a hologram device.

Although an example of varying the incidence angle to the hologram device 3 is shown, the optical axis direction of the illumination apparatus 1 itself may be changed. FIGS. 26A and 26B are figures schematically showing an example of changing an outgoing optical-axis direction of an illumination apparatus 1 having a light source 2 and a hologram device 3. By making the outgoing optical-axis direction of the illumination apparatus 1 closer to a two-dimensional plane direction of the illumination zone 4, the length of the illumination zone 4 in the longitudinal direction dl can be made longer, whereas, by tilting further the outgoing optical-axis direction of the illumination apparatus 1 obliquely downward from the two-dimensional plane direction of the illumination zone 4, the length of the illumination zone 4 in the longitudinal direction dl can be made shorter.

As described above, in the seventh embodiment, since at least one of the length of and the illumination position on the illumination zone 4 in the longitudinal direction dl is changed, for example, when the illumination apparatus 1 of the present embodiment is applied to a vehicle headlight, it can be performed by switching to illuminate at a great distance such as by high-beam illumination, a short distance only, and an intermediate position between the great and short distances.

Eighth Embodiment

An eighth embodiment changes the color of a line-like illumination zone 4.

An illumination apparatus 1 of the eighth embodiment has the same configuration as that of FIG. 1 or FIG. 7, common with the first embodiment, except for an illumination form of the illumination zone 4 different from the illumination form of the first embodiment. The illumination apparatus 1 according to the eighth embodiment illuminates a line-like illumination zone 4, in the same manner as the first embodiment.

Coherent light beams emitted from a plurality of light sources 2 are different in wavelength range from one another. On each of the plurality of hologram devices 3, a coherent light beam in the corresponding wavelength range is incident. A plurality of coherent light beams diffracted by the plurality of hologram devices 3 each illuminate the entire zone of the illumination zone 4. Accordingly, the illumination zone 4 is visually perceived as having a color of coherent light beams in a plurality of wavelength ranges mixed one another. For example, when the plurality of light sources 2 emit RGB three-color coherent light beams, the illumination zone 4 is visually perceived as having a white color that is a mixture of the three colors.

The plurality of coherent light beams emitted from the plurality of light sources 2 may have any wavelength ranges, so that the illumination zone 4 is visually perceived as having a color depending on the wavelength ranges of the plurality of coherent light beams emitted from the plurality of light sources 2.

The plurality of coherent light beams to be emitted from the plurality of light sources 2 may be switched separately as to whether to emit each coherent light beam. Accordingly, while using the same light sources 2, the color of the illumination zone 4 can be changed in accordance with time. Moreover, as shown in FIG. 13, by providing an optical scanning device 8 that scans a plurality of coherent light beams emitted from a plurality of light sources 2 to adjust the illumination position or incidence angle to a plurality of hologram devices 3, the color can be changed for one partial zone or for each of a plurality of partial zones that divide the illumination zone 4.

The present embodiment may be combined with the above-described fifth embodiment. In other words, it may be performed to control whether, on a plurality of hologram devices 3, to make corresponding coherent light beams incident, and a plurality of coherent light beams diffracted by the plurality of hologram devices 3 may be combined before reaching the illumination zone 4.

As described above, in the eighth embodiment, since a plurality of coherent light beams in different wavelength ranges are made incident on the corresponding hologram devices 3, the illumination zone 4 can be illuminated with a color that is a mixture of the plurality of coherent light beams. Moreover, by arbitrarily switching the kinds of coherent light beams to be combined, the color of the entire zone or a partial zone of the illumination zone 4 can be changed.

Ninth Embodiment

A ninth embodiment changes the illumination form of the illumination zone 4 based on a sensor detection result, and in more specifically, switches flashing, the number of lines, width, etc. of a line-like illumination zone 4.

Figure 27:
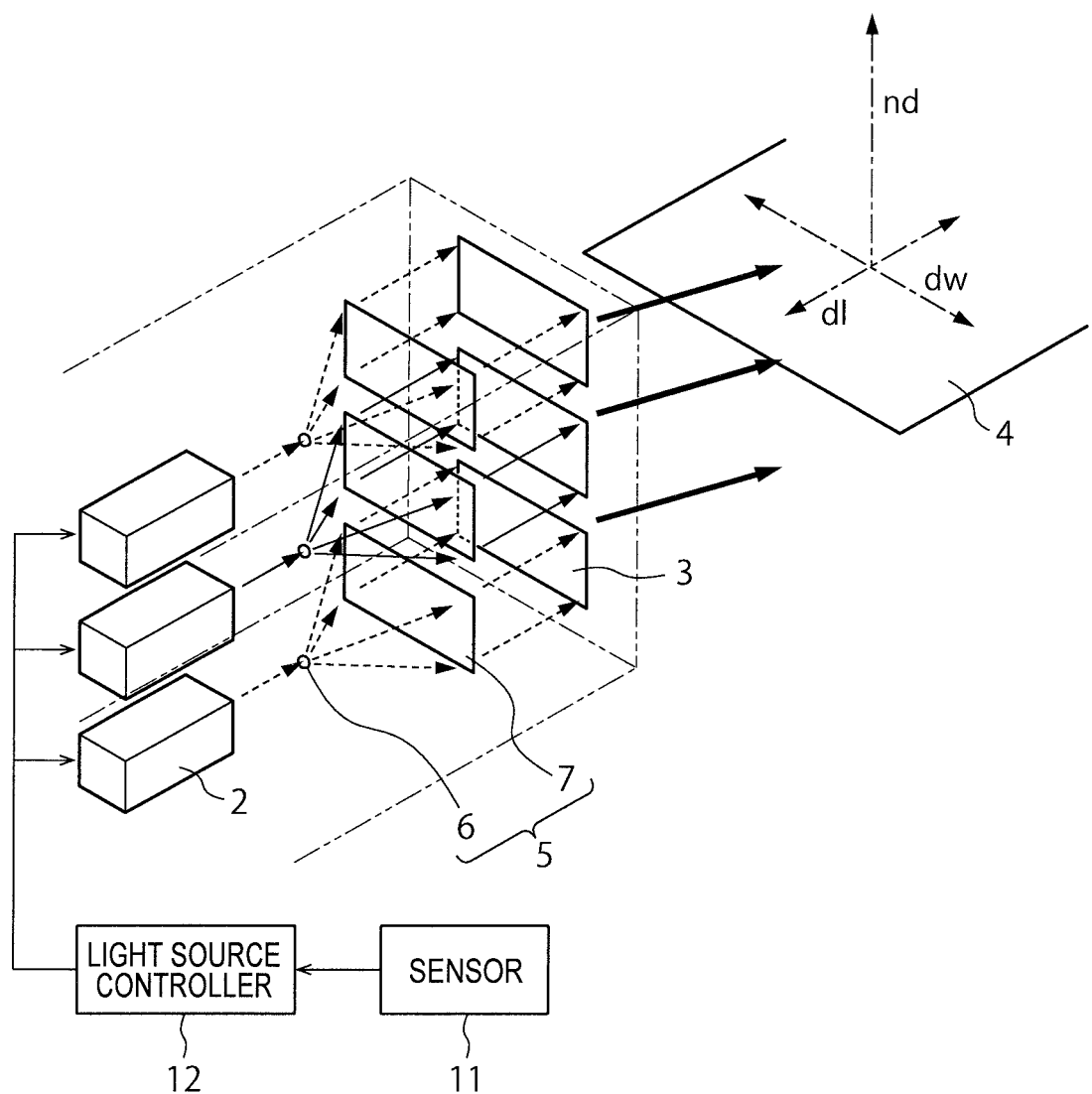
FIG. 27 is a perspective view schematically showing the configuration of an illumination apparatus according to a ninth embodiment of the present discloser.

FIG. 27 is a perspective view schematically showing the configuration of an illumination apparatus 1 according to the ninth embodiment of the present discloser. The illumination apparatus 1 of FIG. 27 has the same configuration as that shown in FIG. 1, added with a sensor 11 and a light source controller 12. The sensor 11 of FIG. 27 is a detector to acquire environmental information on the surroundings of the illumination apparatus 1. It does not matter about the practical type of the sensor 11. For example, when the illumination apparatus 1 is used as a part of a vehicle headlight, the sensor 11 may include an imaging unit for imaging in a vehicle travel direction, and a radar such as a millimeter-wave radar and a laser radar.

The sensor 11 may have a function of detecting whether there is an object such as an obstacle in a vehicle travel direction. In this case, when the obstacle is found by the sensor 11 in the vehicle travel direction, the illumination apparatus 1 can change the illumination form of the illumination zone 4 to draw driver's attention. The change in the illumination form may be performed by flashing the illumination zone 4, switching the color of the illumination zone 4 to an illumination color that can easily draw driver's attention such as red, or changing the number of lines in line illumination, which constitute the illumination zone 4, or the illumination width.

Changing the illumination form, such as flashing, color, number of lines and width of the line-like illumination zone 4 may be performed by switching the number of coherent light beams emitted from the light source 2, the incidence position or the incidence direction of the coherent light beams from the source 2 to the hologram devices 3 from the light source 2. For example, illumination of the illumination zone 4 may be turned on and off by the same method as that of the above-described fourth embodiment. Or the illumination zone 4 may be illuminated with white by the same method as that of the above-described fifth embodiment. Or the width or the number of lines of line illumination of the illumination zone 4 may be switched by the same method as that of the above-described sixth embodiment. Or the color of the illumination zone 4 may be switched by the same method as that of the above-described eighth embodiment.

Moreover, the sensor 11 may have a function of detecting whether a vehicle can pass through a narrow part of a road in the vehicle travel direction, where the road width becomes narrow. In this case, in accordance with the result of detection by the sensor 11 whether the vehicle can pass through the narrow part, the illumination form of the illumination zone 4 may be changed. Especially, when it is not possible to pass through the narrow part, it leads to an accident if no measure is taken, so that it is desirable to illuminate the illumination zone 4 in an illumination form that draws driver's attention.

Furthermore, the sensor 11 may have a function of detecting that a vehicle tire goes off to the shoulder of a road from a lane area. In this case, when the sensor 11 detects that the vehicle tire goes off to the shoulder of the road, the illumination form of the illumination zone 4 may be changed so as to draw driver's attention.

Moreover, the sensor 11 may have a function of detecting the temperature, humidity, brightness, etc. of the surroundings of the illumination apparatus 1. In this case, for example, when the sensor 11 detects that the surroundings of the illumination apparatus 1 becomes brighter, the illumination apparatus 1 may change the illumination form of the illumination zone 4 to raise the illumination intensity of the illumination zone 4, so that the illumination zone 4 can be visually perceived even though the surroundings becomes brighter. Moreover, the illumination apparatus 1 may change the illumination form of the illumination zone 4 depending on the temperature or humidity of the surroundings.

Furthermore, the sensor 11 may have a function of detecting speed or acceleration of a vehicle equipped with the illumination apparatus 1. In this case, when the sensor 11 detects at least one of the vehicle's speed and acceleration, the illumination apparatus 1 may change the illumination form of the illumination zone 4 in accordance with the vehicle's speed or acceleration. In that case, when the sensor 11 detects that the vehicle speed has reached a legal speed limit, the illumination zone 4 may be changed to an illumination form to draw driver's attention to urge a driver to lower the speed. As described above, the sensor 11 may have a function of detecting a plurality of kinds of information.

The light source controller 12 controls the timing of emitting a plurality of coherent light beams from the light sources 2 per coherent light beam, based on a detection result of the sensor 11. In this way, the plurality of coherent light beams are controlled separately to be incident on the corresponding hologram devices 3.

As described above, in the ninth embodiment, since the illumination form of the illumination zone 4 can be changed based on the detection result of the sensor 11, it is possible to draw the attention of a human present in the surroundings of the illumination zone 4 or inform the human of some information. Changing the illumination form may be performed by switching the blinking, color, number of lines, width, etc. of the line-like illumination zone 4, in accordance with the detected content of the sensor 11.

Tenth Embodiment

A tenth embodiment changes the illumination form of the illumination zone 4 based on a detection result of a sensor 11, and, in more specifically, switches the length of a line-like illumination zone 4.

An illumination apparatus 1 of the tenth embodiment is configured in the same manner as in FIG. 27, different from the ninth embodiment in the illumination form of the illumination zone 4.

A sensor 11 applicable to the tenth embodiment may have the same detection functions as those of the various types of sensors 11 explained in the ninth embodiment or may have other detection functions.

An illumination apparatus 1 of the tenth embodiment changes the illumination form of a line-like illumination zone 4, including switching the length of the illumination zone 4, based on a detection result of the sensor 11. In more specifically, in the tenth embodiment, based on the detection result of the sensor 11, the length of the line-like illumination zone 4 in the longitudinal direction dl is switched. Moreover, not only the switching of the length of the illumination zone 4, but also the blinking, color, number of lines, width, etc. of the line-like illumination zone 4 may be switched.

When switching the length of the line-like illumination zone 4, the same method as that of the above-described seventh embodiment can be applied. In other words, among a plurality of element hologram devices 3c in a hologram device 3, the element hologram device 3c on which a coherent light beam from a light source 2 is to be incident may be switched to vary the length of the line-like illumination zone 4 in the longitudinal direction dl. Or the incidence angle at which the coherent light beam from the light source 2 is incident on the hologram device 3 may be switched to vary the length of the line-like illumination zone 4 in the longitudinal direction dl. Or the optical axis itself of the illumination apparatus 1 may be switched to vary the length of the line-like illumination zone 4 in the longitudinal direction dl.

As a specific example of the tenth embodiment, it can be considered that the length of the illumination zone 4 is adjusted in accordance with the braking distance of a vehicle to stop from a point at which brakes are applied. Accordingly, attention can be drawn to a driver. In this case, it is required for the sensor 11 to have a function of detecting the vehicle speed and a function of detecting that the driver operates a brake pedal.

In addition to above, the sensor 11 may detect an obstacle present in a vehicle travel direction to adjust the length of the illumination zone 4 in accordance with the distance to the obstacle. In this case, it is considered that, for example, the sensor 11 has a function of emitting infrared rays to the obstacle to detect the distance to the obstacle using the time from emission to reception of a reflected light of the infrared rays.

As described above, in the tenth embodiment, since based on a detection result of the sensor 11 having various detecting functions, the length of the illumination zone 4 in the longitudinal direction dl is varied, it is possible to draw the attention of a human present in the surroundings of the illumination apparatus 1 or inform the human of some information.

Eleventh Embodiment

An eleventh embodiment varies the irradiation angle of an illumination light beam from an illumination apparatus 1 based on a detection result of a sensor 11.

An illumination apparatus 1 according to the eleventh embodiment is configured in the same manner as in FIG. 27, different from the ninth and tenth embodiments in the illumination form of the illumination zone 4.

A sensor 11 applicable to the eleventh embodiment may have the same detection functions as those of the various types of sensors 11 explained in the ninth and tenth embodiments or may have other detection functions.

An illumination apparatus 1 according to the eleventh embodiment changes the illumination form of the illumination zone 4, including switching the illumination angle to the illumination zone 4, based on a detection result of the sensor 11. Switching the illumination angle to the illumination zone 4 may be performed by the same method as that of the above-described seventh embodiment. For example, the illumination angle of a coherent light beam to be incident on a hologram device 3 from a light source 2 may be varied to vary the diffraction angle of the hologram device 3, and, as a result, vary the illumination angle to the illumination zone 4. In order to vary the illumination angle of the coherent light beam to be incident on the hologram device 3 from the light source 2, for example, as shown in FIG. 13, an optical scanning device 8 may be provided between the light source 2 and the hologram devices 3 to switch the travel direction of the coherent light beam from the light source 2.

Or, the outgoing optical-axis direction of the illumination apparatus 1 may be changed to vary the illumination angle to the illumination zone 4.

As a specific example of the sensor 11, a sensor 11 having a function of detecting a slope present in a vehicle travel direction is considered. Specifically, it may be a vehicle height sensor attached to a vehicle or an angle of the vehicle to a road surface may be calculated by an acceleration sensor built in an ECU (Engine Control Unit). The slope to be detected by the sensor 11 may either be a downward slope or an upward slope. The slope detection can be performed relatively easily using a GPS sensor. Or a slope position may be detected by mapping of map data with preregistered slope information and a vehicle position.

When an upward slope is present in a vehicle travel direction, it is desirable to set an illumination direction at obliquely upward in accordance with an inclination angle of the upward slope. Accordingly, it is possible to illuminate far beyond the upward slope, so that a driver can have a wider field of vision to drive more easily. Moreover, when a downward slope is present in the vehicle travel direction, it is desirable to set the illumination direction at obliquely downward in accordance with the inclination angle of the downward slope. Accordingly, it is possible to illuminate far beyond the downward slope, so that it is easier to drive in the same manner.

As described above, in the eleventh embodiment, since the irradiation angle of the illumination light beam is varied based the detection result of the sensor 11, when a slope is present in the vehicle travel direction, it is possible to illuminate far beyond the slope.

Twelfth Embodiment

A twelfth embodiment controls a vehicle together with changing the illumination form of the illumination zone 4 based on a detection result of the sensor 11. In more specifically, at the same time as the changing of the illumination form or when a predetermined time elapses after the changing of the illumination form in the same manner as the illumination apparatus 1 of any one of the ninth to eleventh embodiments, a vehicle equipped with the illumination apparatus 1 is controlled.

Figure 28:
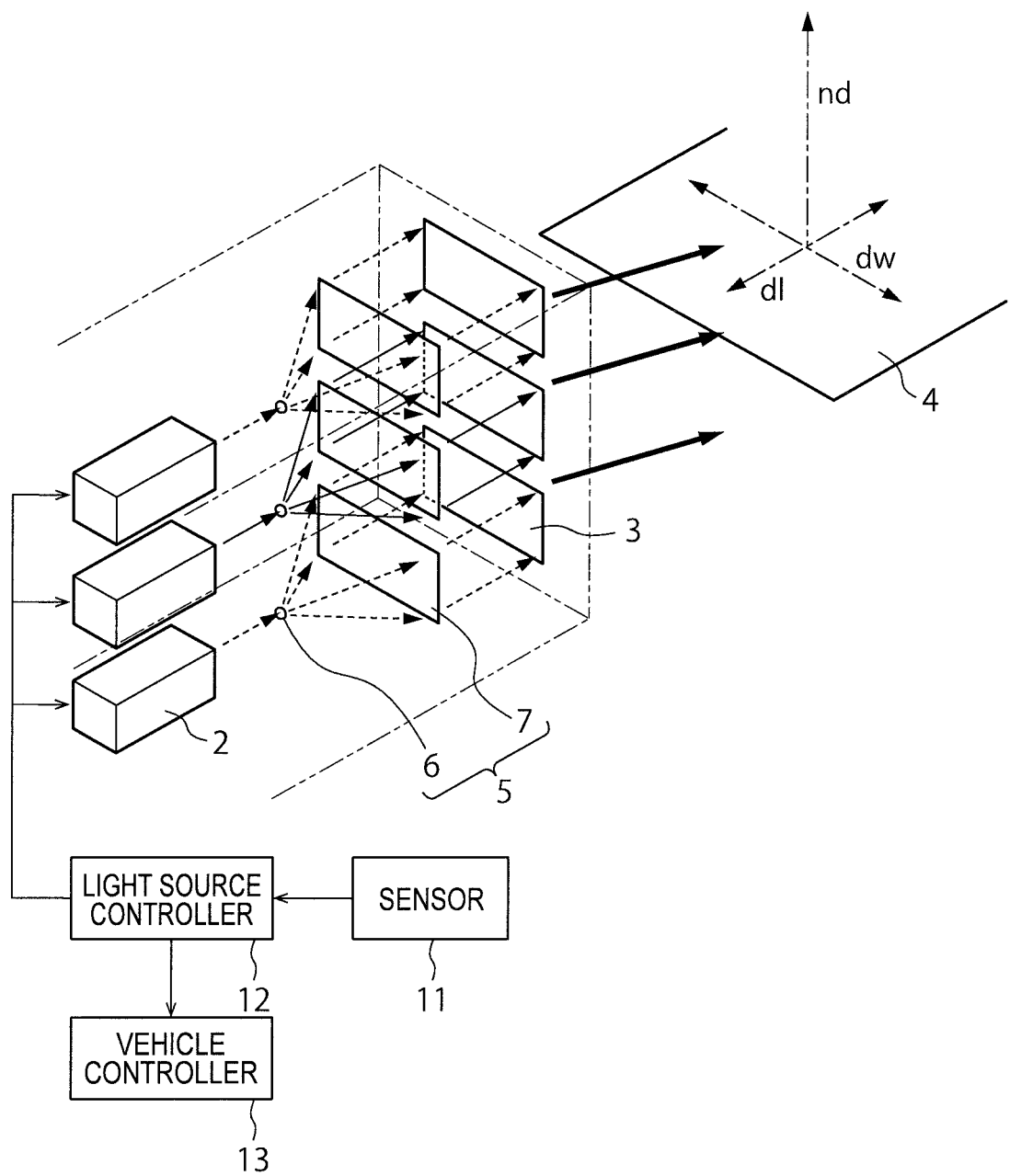
FIG. 28 is a perspective view schematically showing the configuration of an illumination apparatus according to a twelfth embodiment of the present discloser.

FIG. 28 shows the illumination apparatus of FIG. 27, added with a vehicle controller 13. As the vehicle controller 13, ECU (Engine Control Unit) and the like are listed as examples. For example, although the sensor 11 detects an obstacle in a vehicle travel direction and the illumination apparatus 1 changes the illumination form of the illumination zone 4 to draw the driver's attention, even when a driver does not notice illumination for drawing attention, the vehicle controller 13 can control a vehicle to take action to avoid the obstacle.

As an example of practical control method, the light source controller (detector) 12 acquires environmental information through the sensor 11 and, based on the acquired environmental information, the vehicle controller 13 changes the illumination form.

In more specifically, after changing the illumination form, when there is no change in the vehicle after the elapse of a predetermined time, the vehicle controller 13 may control the vehicle. As specific examples of vehicle control, it may be performed to restrict the engine output, operate the brakes or operate the transmission to decelerate the vehicle. Or the staring wheel may be operated to change the vehicle direction.

Whether there is change in the vehicle is determined by the vehicle controller 13 based on detection information of the sensor 11 acquired by the light source controller (detector) 12.

After controlling the vehicle in conjunction with the change in illumination form based on the detection information of the sensor 11, if vehicle control is not needed, it may be performed to return the illumination form to the original form and the vehicle to the state before being controlled.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An illumination apparatus that illuminates an illumination zone having a first direction and a second direction crossing the first direction comprising:
   a light source to emit a plurality of coherent light beams having the same wavelength ranges; and
   a diffraction optical device to diffract the coherent light beam incident from the light source so that a width of the illumination zone in the second direction gradually becomes wider along the first direction of the illumination zone from a nearer side to the diffraction optical device,
   wherein the diffraction optical device comprises:
   a plurality of diffraction zones provided corresponding to the plurality of coherent light beams, respectively, the diffraction zones diffracting the corresponding coherent light beams to illuminate the illumination zone; and
   a light source controller.

2. The illumination apparatus of claim 1, wherein a diffusion angle of the coherent light beams diffracted by the diffraction optical device in the second direction of the illumination zone is constant in an entire zone of the illumination zone in the first direction.

3. The illumination apparatus of claim 1,
   wherein the diffraction optical device diffracts the plurality of coherent light beams incident from the light source so that indicators are displayed in at least part of the illumination zone in the first direction.

4. The illumination apparatus of claim 3, wherein the indicators are displayed at a predetermined interval in the first direction of the illumination zone, an illumination form of the indicators being different from an illumination form of the illumination zone.

5. The illumination apparatus of claim 3, wherein the indicators are displayed at an end of the illumination zone in the first direction, an illumination form of the indicators being different from an illumination form of the illumination zone.

6. The illumination apparatus of claim 3, wherein the indicators are arranged so as to divide the illumination zone per predetermined distance along the first direction.

7. The illumination apparatus of claim 1, wherein the light source controller flashes the illumination zone by switching as to whether to make the coherent light beams incident on the diffraction optical device.

8. The illumination apparatus of claim 2, wherein the light source controller flashes the illumination zone by switching as to whether to make the coherent light beams incident on the diffraction optical device.

* * * * *